United States Patent
Asanuma et al.

(10) Patent No.: US 12,276,508 B2
(45) Date of Patent: Apr. 15, 2025

(54) DETERMINATION DEVICE, PATH DETERMINATION METHOD, NON-TRANSITORY COMPUTER READABLE STORAGE MEDIUM, PATH DETERMINATION SYSTEM, AND AIR VEHICLE DEVICE

(71) Applicant: SoftBank Corp., Tokyo (JP)

(72) Inventors: Kunimitsu Asanuma, Tokyo (JP); Akitoshi Shimada, Tokyo (JP); Suguru Yasuraoka, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 394 days.

(21) Appl. No.: 17/642,955

(22) PCT Filed: Mar. 24, 2021

(86) PCT No.: PCT/JP2021/012367
§ 371 (c)(1),
(2) Date: Mar. 15, 2022

(87) PCT Pub. No.: WO2021/256042
PCT Pub. Date: Dec. 23, 2021

(65) Prior Publication Data
US 2022/0333929 A1 Oct. 20, 2022

(30) Foreign Application Priority Data
Jun. 19, 2020 (JP) ................. 2020-106499

(51) Int. Cl.
*G01C 21/28* (2006.01)
*G01S 19/43* (2010.01)
(Continued)

(52) U.S. Cl.
CPC .............. *G01C 21/28* (2013.01); *G01S 19/43* (2013.01); *G05D 1/101* (2013.01); *G08G 5/34* (2025.01)

(58) Field of Classification Search
None
See application file for complete search history.

(56) References Cited

U.S. PATENT DOCUMENTS 9,552,736 B2    1/2017  Taveira
9,911,346 B2    3/2018  Klinger et al.
(Continued)

FOREIGN PATENT DOCUMENTS

CN    1929336 A      3/2007
CN    110049920 A    7/2019
(Continued)

OTHER PUBLICATIONS

Van Sickle, Jan, "RTK," 2019, The Pennsylvania State University, "GEOG 862: GPS and GNSS for Geospatial Professionals," Lesson 7, pp. (Year: 2019).*

(Continued)

*Primary Examiner* — Aniss Chad
*Assistant Examiner* — Madison R. Inserra
(74) *Attorney, Agent, or Firm* — XSENSUS LLP

(57) ABSTRACT

A determination device according to one embodiment includes an acquiring unit (231) and a determination unit (233). The acquiring unit (231) acquires positional information that is related to a terminal device installed at an arbitrary location serving as a reference for a path of an air vehicle and that is calculated on the basis of correction information that includes information on coordinates of a reference station associated with an area in which the terminal device is positioned and information based on a satellite signal received by the reference station. The deter- (Continued)

mination unit (233) determines a flight path of the air vehicle on the basis of the positional information acquired by the acquiring unit.

9 Claims, 19 Drawing Sheets

(51) Int. Cl.
*G05D 1/00* (2024.01)
*G08G 5/34* (2025.01)
*A23B 40/60* (2025.01)
*B64C 13/20* (2006.01)
*G01C 21/36* (2006.01)
*G01S 19/04* (2010.01)
*G01S 19/07* (2010.01)
*G01S 19/15* (2010.01)
*H10D 64/27* (2025.01)
*H10D 84/01* (2025.01)
*H10F 77/169* (2025.01)
*H10H 29/80* (2025.01)

(56) References Cited

U.S. PATENT DOCUMENTS

| | | |
|---|---|---|
| 2007/0063891 A1 | 3/2007 | Matsumoto |
| 2016/0284221 A1 | 9/2016 | Hinkle et al. |
| 2017/0334559 A1 | 11/2017 | Bouffard et al. |
| 2018/0059659 A1 | 3/2018 | Takeuchi et al. |
| 2018/0284293 A1 | 10/2018 | Pan |
| 2018/0356840 A1 | 12/2018 | Ham et al. |
| 2019/0103032 A1 | 4/2019 | Sasaki |
| 2020/0151867 A1* | 5/2020 | Pyznar ............... G01M 5/0075 |
| 2020/0184706 A1 | 6/2020 | Speasl et al. |
| 2021/0287557 A1 | 9/2021 | Matsuki et al. |

FOREIGN PATENT DOCUMENTS

| | | |
|---|---|---|
| JP | 2002-365358 A | 12/2002 |
| JP | 2017-538098 A | 12/2017 |
| JP | 2018-30407 A | 3/2018 |
| JP | 2018-511136 A | 4/2018 |
| JP | 2019-67252 A | 4/2019 |
| JP | 2019-120986 A | 7/2019 |
| JP | 2019-144982 A | 8/2019 |
| JP | 2019-190975 A | 10/2019 |
| JP | 6634142 B1 | 1/2020 |
| JP | 6637214 B1 | 1/2020 |
| JP | 6644944 B1 | 2/2020 |
| JP | 2020067358 A | 4/2020 |
| JP | 2021-56041 A | 4/2021 |
| WO | WO-2020143004 A1 * | 7/2020 |

OTHER PUBLICATIONS

Office Action issued on Aug. 15, 2022, in corresponding Taiwanese patent Application No. 110120952, 20 pages.
International Search Report and Written Opinion mailed on Jun. 1, 2021, received for PCT Application PCT/JP2021/012367, Filed on Mar. 24, 2021, 10 pages including English Translation.
Japanese Decision to Grant a Patent issued Nov. 21, 2023 in corresponding Japanese Patent Application No. 2021-109439, 3 pages.
Chinese Office Action issued Mar. 18, 2024 in corresponding Chinese Patent Application No. 202180005230.5, 13 pages.
Office Action issued on Aug. 1, 2023, in corresponding Japanese patent Application No. 2021-109439, 5 pages.
Office Action issued Dec. 13, 2022 in Japanese Patent Application No. 2021-109439, 5 pages.
Japanese Notice of Reasons for Refusal issued Aug. 27, 2024 in corresponding Japanese Patent Application No. 2023-158219, 10 pages.

* cited by examiner

DETERMINATION DEVICE, PATH DETERMINATION METHOD, NON-TRANSITORY COMPUTER READABLE STORAGE MEDIUM, PATH DETERMINATION SYSTEM, AND AIR VEHICLE DEVICE

CROSS-REFERENCE TO RELATED APPLICATIONS

The present application is based on PCT filing PCT/JP2021/012367, filed Mar. 24, 2021, which claims priority to JP 2020-106499, filed Jun. 19, 2020, the entire contents of each are incorporated herein by reference.

FIELD

The present invention relates to a determination device, a path determination method, a path determination program, a path determination system, and an air vehicle device.

BACKGROUND

In recent years, the needs of high-precision positioning are increased.

For example, in Patent Literature 1, a car navigation support technology has been proposed, in which a path conforming to a condition of a user is searched on the basis of positional information acquired by using a real time kinematic (RTK) technique and a moving vehicle (automobile) is allowed to perform autonomous driving along the searched path.

CITATION LIST

Patent Literature

Patent Literature 1: Japanese Laid-open Patent Publication No. 2019-190975

SUMMARY

Solution to Problem

A determination device includes an acquiring unit that acquires positional information that is related to a terminal device installed at an arbitrary location serving as a reference for a path of an air vehicle and that is calculated on the basis of correction information that includes information on coordinates of a reference station associated with an area in which the terminal device is positioned and information based on a satellite signal received by the reference station. The determination device includes a determination unit that determines a flight path of the air vehicle on the basis of the positional information acquired by the acquiring unit.

DESCRIPTION OF EMBODIMENTS

Figure 1:
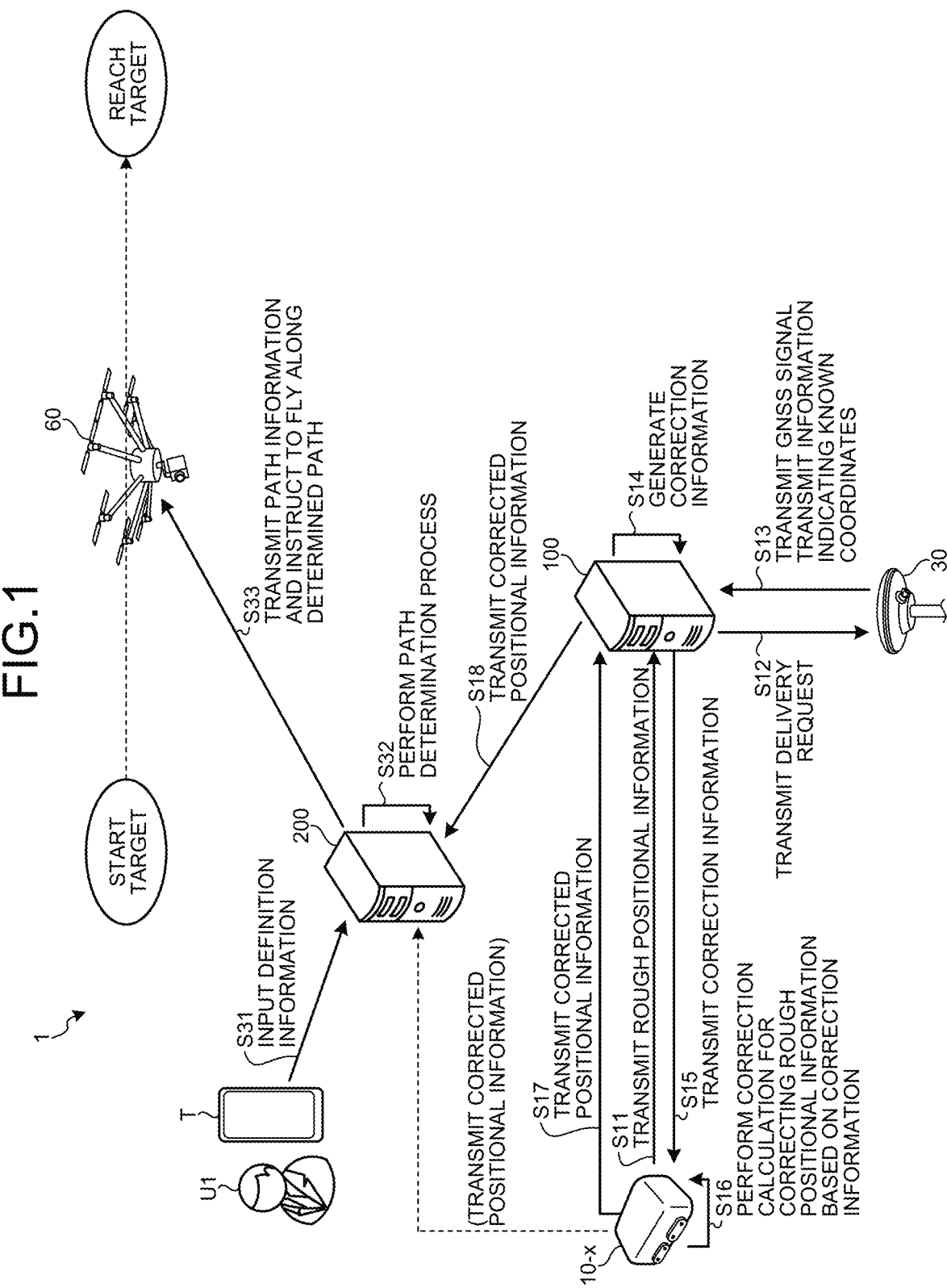
FIG. 1 is a diagram illustrating an example of the overall flow of a path control process associated with an edge service.

One preferred embodiment for carrying out a determination device, a path determination method, a path determination program, a path determination system, and an air vehicle device (hereinafter, referred to as an "embodiment") will be explained below with reference to the accompanying drawing as appropriate. Furthermore, the determination device, the path determination method, the path determination program, the path determination system, and the air vehicle device according to the present invention are not limited to the embodiment. Furthermore, in the embodiment below, the same reference numerals are assigned to the same part and overlapping descriptions will be omitted. Furthermore, in the description below, a technique for acquiring positional information on the basis of calculation is sometimes referred to as "positioning".

Embodiment

1. Outline of a Path Control Process According to the Embodiment

First, the outline of a path control process according to the embodiment will be described. For example, in various fields, providing solutions and services that effectively use positional information on drones, construction apparatuses, agricultural apparatuses, automobiles, or the like is expected. For example, drones are becoming widely used its use area not only in a simple use for aerial photography but also the industrial use or the private use, such as an inspection of a roof, a wall, a solar panel, or a power transmission line. Furthermore, drones are becoming used for disaster aid or search and rescue activities performed by the police and the fire departments.

In contrast, for example, GNSS (or GPS) positioning is used for drones that are commonly used; however, an error is sometimes generated in positional information obtained by a global navigation satellite system (GNSS) in units of few meters as compared to actual positional information. In this case, the risk of accidents (for example, damage to goods caused by a collision with a wall or a power transmission line, a danger to residents, or the like) caused by the error generated in the positional information is possibly increased.

Accordingly, for example, the effective use of drones that perform positioning using the real time kinematic (RTK) technique is effectively used. Furthermore, there is a need to improve the usability of path setting of an air vehicle.

Conventionally, for example, if a user desires to fly a drone to a certain target point, the user needs to input positional information that indicates the position of the target point. As a technique for inputting the positional information, a UI that designates, for example, a waypoint on a map displayed on a screen is sometimes used. However, in this case, it is only possible to designate a rough target point and, in some cases, it is not possible to allow the drone to reach the target point. If it is not possible to allow the drone to accurately reach the target point, the risk of accidents described above is increased. Accordingly, the user needs to input, as positional information indicating the position of the target point, positional information that is set on the basis of a uniquely defined absolute value.

However, it is sometimes difficult to obtain the positional information prescribed on the basis of the absolute value. For example, when designing a path along which a drone is allowed to fly for the purpose of inspecting a wall of a specific building, it is possible to obtain absolute positional information by designing dedicated programming accordance with this use application or performing a manual input; however, a substantial effort may be needed for the programming or the manual input. Furthermore, the program obtained here is not sometimes reused for another intended use (for example, a wall inspection of another building that is different from the specific building), which lacks versatility.

In contrast, in the path control process according to the embodiment, it is possible to improve the usability of path setting targeted for an air vehicle. For example, in the path control process according to the embodiment, it is possible to automatically calculate, on the system side, positional information. Namely, with the path control process according to the embodiment, a user is able to easily and accurately set a target point. Furthermore, with the path control process according to the embodiment, there is no need to prepare a program in accordance with the intended use or perform a manual input. Namely, the path control process according to the embodiment can improve a degree of freedom of path setting.

Specifically, the path control process according to the embodiment may acquire positional information on a terminal device installed at an arbitrary location that serves as a reference for the path of the air vehicle. The path control process according to the embodiment may generate correction information on the basis of the coordinates of a reference station that is associated with an area in which the terminal device is positioned. The path control process according to the embodiment may acquire the positional information on the terminal device on the basis of the correction information. The path control process according to the embodiment may determine a flight path of the air vehicle on the basis of the acquired positional information on the terminal device.

More specifically, the path control process according to the embodiment may accept, from a user, definition information for defining, for example, the flight path (for example, a target point on the flight path). The path control process according to the embodiment may determine the flight path of the air vehicle on the basis of, for example, the positional information calculated on the basis of correction information and the definition information. For example, the path control process according to the embodiment may calculate, as the position of the target point, a position that satisfies the definition information and that is a relative position based on, as a reference, the position indicating the positional information calculated on the basis of the correction information. Furthermore, the path control process according to the embodiment may determine, as the flight path of the air vehicle, an orbit along which the air vehicle is allowed to fly to, for example, the calculated position as a target.

2. Overview of Path Control Process According to Embodiment

In the following, an example of the overall flow of the path control process according to the embodiment will be described with reference to the drawings. Furthermore, in the path control process according to the embodiment, a service (edge service) for calculating the positional information that indicates a position of the own terminal may be developed on the basis of the correction information on a terminal device 10-$x$ that will be described later. Furthermore, in the path control process according to the embodiment, a service (cloud service) for calculating positional information on the terminal device 10-$x$ may be developed on the basis of the correction information on a delivery device 100 side that will be described later. With the edge service, it is possible to process information on the edge side (i.e., on the terminal device 10-$x$ side) and it is thus possible to perform positioning at a relatively high speed. Namely, it is possible to implement superior real-time positioning. Furthermore, with the cloud service, there is no need to package a calculation function to the terminal on the edge side; therefore, it is possible to implement a reduction in size of the terminal, power consumption, and data traffic.

Figure 2:
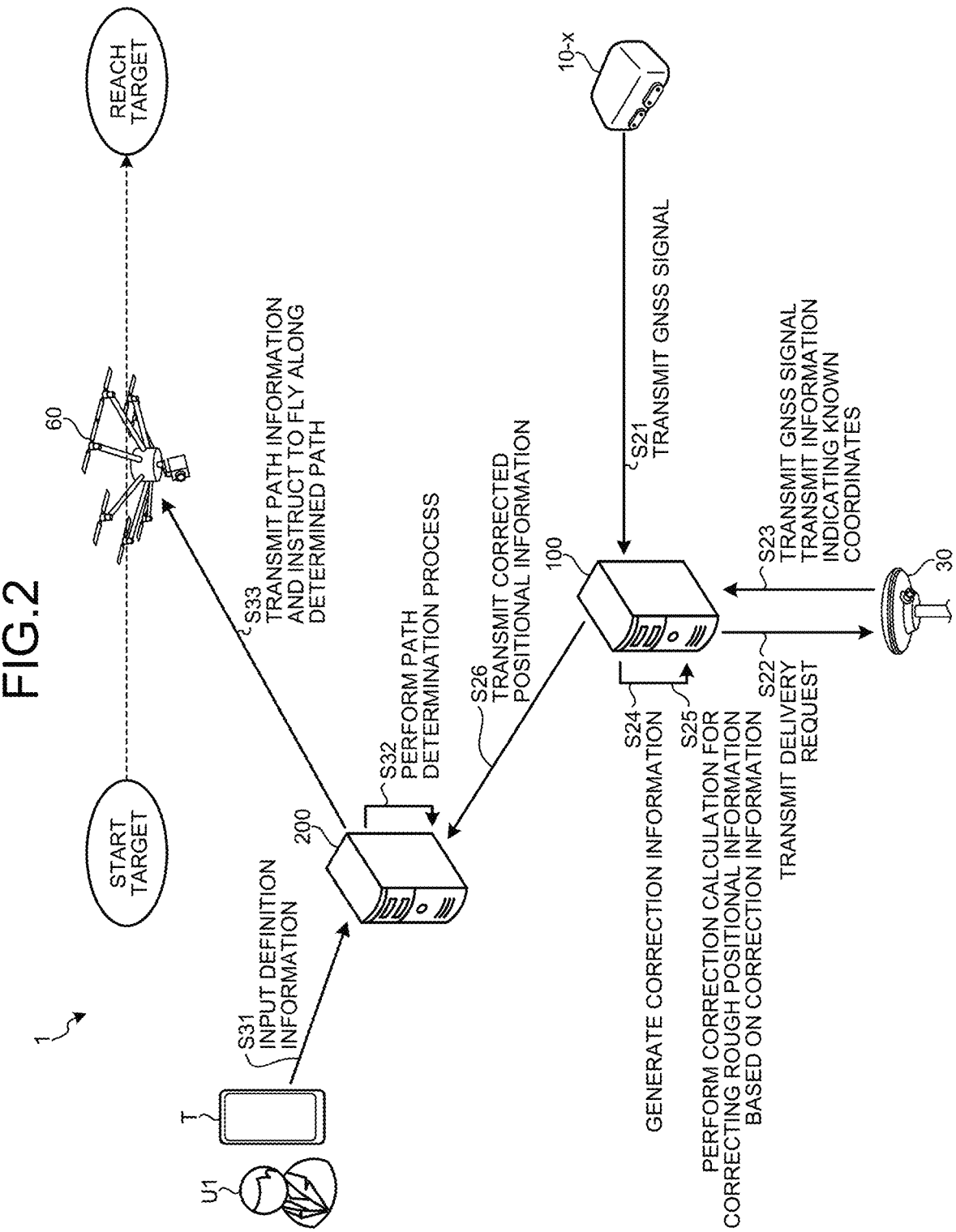
FIG. 2 is a diagram illustrating, as a modification, the overall flow of a path control process associated with a cloud service.

FIG. 1 illustrates an example of the overall flow of the path control process associated with the edge service. FIG. 2 illustrates, as a modification, the overall flow of the path control process associated with the cloud service.

A path determination system 1 may include the terminal device 10-$x$, a reference station 30, an air vehicle 60, the delivery device 100, and a determination device 200. The terminal device 10-$x$, the reference station 30, the air vehicle 60, the delivery device 100, and the determination device 200 may be connected in a wired or wireless manner via a network N so as to be capable of communicating with each other.

The network N may include the Internet. The network N may include a mobile unit communication network. The mobile unit communication network may conform to, for example, the third generation (3G) communication system. The mobile unit communication network may conform to, for example, Long Term Evolution (LTE) communication system. The mobile unit communication network may conform to, for example, the fifth generation (5G) communication system. The mobile unit communication network may conform to a communication system of the sixth generation (6G) communication system and the subsequent generation communication system. The network N may include satellite communication. The network N may include wireless communication, such as a low power wide area (LPWA) network or Bluetooth (registered trademark). Furthermore, the network N is not particularly limited as long as each of the terminal device 10-x, the reference station 30, the air vehicle 60, the delivery device 100, and the determination device 200 can be connected to a server in a wired or wireless manner.

FIG. 1 exemplifies a case where a user U1 performs path setting of, with respect to the determination device 200 by using the terminal device 10-x, a path along which the air vehicle 60 is allowed to fly in accordance with an intended use. The terminal device 10-x may be a portable information processing terminal that can be installed at an arbitrary location that serves as a reference for the path of the air vehicle. The terminal device 10-x may be a stationary information processing terminal that is fixedly installed at an arbitrary location that serves as a reference for the path for the air vehicle. The terminal device 10-x may be a terminal device owned by the user U1. The terminal device 10-x may be used by the user U1 to who is authorized to use the terminal device 10-x. Furthermore, the terminal device 10-x may be installed at an arbitrary location conforming to the intended use. For example, if the user U1 inspects an exterior wall on a predetermined floor of a building object BD (for example, a building), the user U1 may allow the air vehicle 60 to fly along the exterior wall of the subject floor. In this case, the user U1 is able to install the terminal devices 10-x at, for example, the both ends of the building on the ground associated with the wall. Furthermore, the both ends of the building on the ground are examples of the arbitrary locations that serve as the references for the flight path, and furthermore, the location in which the terminal device 10-x is installed is not limited to this. Furthermore, many variations are possible for an installation method and descriptions thereof in detail will be described later.

The terminal device 10-x may receive a satellite signal. Specifically, the terminal device 10-x may receive, for example, a GNSS signal. Namely, the terminal device 10-x may mount thereon, for example, a GNSS module (positioning module) including a GNSS receiver responding to RTK and an antenna. Furthermore, the terminal device 10-x may mount thereon a communication module for communicating with the delivery device 100 or the determination device 200.

The terminal device 10-x may perform positioning on the basis of the correction information. Specifically, first, the terminal device 10-x may acquire the positional information on the own terminal on the basis of the satellite signal. Then, the terminal device 10-x may receive the correction information delivered from the delivery device 100 that will be described later. The terminal device 10-x may correct the positional information on the own terminal acquired from the satellite signal on the basis of the correction information. More specifically, the terminal device 10-x may correct the positional information on the own terminal on the basis of RTK calculation performed by using, for example, the correction information. Namely, the terminal device 10-x may acquire corrected positional information on the basis of the RTK calculation performed by using the correction information. The terminal device 10-x may install therein a program capable of implementing the RTK calculation. Furthermore, the RTK calculation may be performed by using a conventionally known technique.

Hereinafter, if the terminal devices 10-x are distinguished from each other, the terminal devices 10-x are referred to as a terminal device 10-1, a terminal device 10-2, and the like by substituting an arbitrary number for "x". The terminal device 10-x may sometimes be simply referred to as the terminal device 10.

The reference station 30 may function as a reference station at the time of the RTK calculation. Namely, coordinates (known coordinates) indicating the position of the reference station 30 may be defined in the reference station 30. Furthermore, if the plurality of reference stations 30 are present, the known coordinates may be defined in the plurality of reference stations 30. The reference station 30 may have a reception function for receiving a satellite signal. Specifically, the reference station 30 may have, for example, a GNSS signal reception function for capable of receiving a GNSS signal. Namely, the reference station 30 may receive the GNSS signal. The reference station 30 may transmit information on the known coordinates and information based on the GNSS signal to the delivery device 100. The information based on the GNSS signal may include information that indicates a satellite that has received the GNSS signal, information that indicates the phase of carrier waves, and the like. Specifically, the reference station 30 may transmit various kinds of information to the delivery device 100 on the basis of, for example, the standards for the Radio Technical Commission for Maritime Services (RTCM). Furthermore, the reference station 30 may transmit, for example, an ephemeris to the delivery device 100. Furthermore, the reference station 30 may be appropriately installed at an arbitrary point by an arbitrary business enterprise. Furthermore, the reference station 30 may be installed by a business enterprise that manages, for example, the path determination system 1. Furthermore, the reference station 30 may receive a signal from a satellite other than the GNSS. The reference station 30 may receive a signal from another arbitrary satellite, such as a regional navigation satellite system (RNSS).

The air vehicle 60 may be, for example, a drone. The air vehicle 60 may be used by the user U1. Furthermore, the air vehicle 60 may mount thereon a positioning module for performing positioning of the own vehicle. The air vehicle 60 may mount thereon the terminal device 10-x as a device including, for example, the positioning module. Namely, the air vehicle 60 may acquire the corrected positional information that indicates the position of the own vehicle on the basis of RTK calculation performed by using the correction information. Furthermore, the RTK calculation may be performed by using a conventionally known technique. Furthermore, the air vehicle 60 and the terminal device 10-x may be different devices. Namely, the user U1 may perform positioning on the air vehicle 60 by installing the terminal device 10-x on, for example, an air vehicle body of the ready-made air vehicle 60 later. Furthermore, the air vehicle 60 and the terminal device 10-x may be an integrally formed device. Namely, the user U1 may perform positioning on the air vehicle 60 by using, for example, the air vehicle 60 having the same function as that of the terminal device 10-x as one of the functions.

Furthermore, the air vehicle 60 may mount thereon an air vehicle device that can perform automatic control of the air vehicle body. The air vehicle device may perform automatic control of the air vehicle 60 on the basis of the path information acquired from the determination device 200. The air vehicle device may perform automatic control of the air vehicle 60 so as to fly along, for example, the flight path determined by the determination device 200. Furthermore, the air vehicle device may be regard as the air vehicle 60 itself. Namely, the air vehicle device mounted on the air vehicle 60 may be restated as the air vehicle device 60.

The delivery device 100 may be, for example, a server device. The delivery device 100 may receive, from the reference station 30, information on the known coordinates of the reference station 30 and information on the satellite signal received by the reference station 30. The delivery device 100 may generate information (correction information) for correcting an error of the positioning performed by the terminal device 10-*x* on the basis of the information on the satellite signal and the information on the known coordinates of the reference station 30 that is a processing target from among the reference stations 30. The correction information may include, for example, information on the known coordinates of the reference station 30 and information on the phase of carrier waves sent from a satellite. The delivery device 100 may transmit the generated correction information to the terminal device 10-*x*. Furthermore, the information included in the correction information is not limited to the example described above. The correction information may arbitrarily include information needed for the RTK calculation performed by the terminal device 10-*x*.

In the following, positioning performed by the RTK calculation using the correction information will be described. First, the terminal device 10-*x* may acquire approximate positional information (rough positional information) on the own terminal by performing positioning on the basis of the satellite signal. Furthermore, the delivery device 100 may generate correction information that includes the information on the known coordinates of the reference station 30 and the information based on the satellite signal. The delivery device 100 may transmit the correction information to the terminal device 10-*x*. The terminal device 10-*x* may correct the rough positional information on the basis of the RTK calculation performed by using the correction information. Namely, the terminal device 10-*x* may calculate, on the basis of the RTK calculation, information (corrected positional information) obtained by correcting the rough positional information using the correction information. Consequently, the path control process according to the embodiment can acquire relatively high accurate positional information on the terminal device 10-*x*. Furthermore, the RTK calculation may be performed by using a conventionally known technique.

The terminal device 10-*x* may transmit the corrected positional information to the delivery device 100. Furthermore, the delivery device 100 may transmit the corrected positional information to the determination device 200.

The determination device 200 may be, for example, a server device. The determination device 200 may determine a flight path of the air vehicle 60 on the basis of the path control process according to the embodiment. The determination device 200 may receive the corrected positional information on the terminal device 10-*x* from the delivery device 100. The determination device 200 may acquire positional information on the terminal device 10-*x* calculated on the basis of, for example, the known coordinates of the reference station 30. The determination device 200 may determine the flight path of the air vehicle 60 on the basis of the acquired corrected positional information. Furthermore, the path control process may be implemented by a path determination program according to the embodiment being executed in the determination device 200.

In the following, an example of the overall flow of the path control process according to the embodiment will be described. Furthermore, in the path control process, a case will be described as an example in which the GNSS signal is used as a satellite signal. FIG. 1 exemplifies an example in which the terminal device 10-*x* has already been installed at an arbitrary location in accordance with an intended use desired by the user U1. Furthermore, the satellite signal that is used in the path control process is not limited as long as positioning of the terminal device 10-*x* is possible. For example, a satellite signal received from the other arbitrary satellite, such as a RNSS, may be used.

First, it is assumed that the user U1 turns ON a power supply of the terminal device 10-*x*. If the power supply is turned ON, the terminal device 10-*x* may receive the GNSS signal. The terminal device 10-*x* may calculate the positional information indicating the position of the own terminal (installation position) by performing GNSS positioning on the basis of the GNSS signal. The positional information may be approximate positional information (rough positional information) that can indicate a position within a range of several kilometers around the actual position of the own terminal. The terminal device 10-*x* may transmit the rough positional information to the delivery device 100 (Step S11). Namely, if the power supply is turned ON, the terminal device 10-*x* is able to notify the path determination system 1 of the approximate position of the own terminal by using the rough positional information.

The delivery device 100 may select the reference station 30 that is a processing target from among the reference stations 30 installed in various locations on the basis of the rough positional information received from the terminal device 10-*x*. For example, the delivery device 100 may select, as the reference station 30 corresponding to the processing target, the reference station 30 that is present in an area associated with the position indicated by the rough positional information.

Then, the delivery device 100 may transmit, to the selected reference station 30, a delivery request that is a request to deliver the GNSS signal (Step S12). The reference station 30 may always receive the GNSS signal. Namely, the reference station 30 that is the processing target may transmit, to the delivery device 100, information based on the GNSS signal that is received when the delivery request is received (Step S13).

Furthermore, after the delivery request is received, the reference station 30 corresponding to the processing target may continuously transmit the GNSS signal to the delivery device 100. Furthermore, the reference station 30 may always push the GNSS signal to the delivery device 100. Namely, the reference station 30 may transmit the GNSS signal to the delivery device 100 even when the delivery request is not received from the delivery device 100. In this case, the delivery device 100 may accumulate the received GNSS signal.

Furthermore, if the delivery request is received, the reference station 30 corresponding to the processing target may transmit the information indicating the known coordinates of the own device to the delivery device 100. The reference station 30 corresponding to the processing target may transmit the information indicating the known coordinates of the device together with the information based on the GNSS signal to the delivery device 100. The delivery device 100 may previously store therein the information indicating the known coordinates of the reference station 30.

The delivery device 100 may generate the correction information on the basis of the information that indicates the known coordinates of the reference station 30 corresponding to the processing target and the information based on the GNSS signal. When the GNSS signal is received from the reference station 30 corresponding to the processing target, the delivery device 100 may generate the correction information (Step S14). Then, the delivery device 100 may transmit the generated correction information to the terminal device 10-x that is the transmission source of the rough positional information (Step S15).

The terminal device 10-x may perform correction calculation that corrects the rough positional information on the basis of the received correction information (Step S16). Specifically, for example, the terminal device 10-x may calculate the corrected positional information by correcting the rough positional information by performing the RTK calculation using the correction information.

The terminal device 10-x may transmit the corrected positional information to the delivery device 100 (Step S17). When the corrected positional information is received from the terminal device 10-x, the delivery device 100 may transmit the received corrected positional information to the determination device 200 (Step S18). The determination device 200 may acquire (receive) the corrected positional information from the delivery device 100.

The determination device 200 may store the acquired corrected positional information in a storage unit 220. For example, the determination device 200 may associate the identification information for identifying the terminal device 10-x with the corrected positional information obtained from the RTK calculation performed by the terminal device 10-x and store the associated information in the storage unit 220.

Moreover, the terminal device 10-x transmits the rough positional information to the delivery device 100 when the power supply is turned ON; however, the terminal device 10-x need not transmit the rough positional information after that. In this case, if the delivery device 100 receives the rough positional information once, the delivery device 100 may continuously repeat the processes at Steps S12 to S15. Then, the delivery device 100 may continuously transmit the correction information to the terminal device 10-x that is the transmission source of the rough positional information. Therefore, the terminal device 10-x may repeat the processes at Steps S16 and S17 every time the terminal device 10-x continuously receives the correction information. Furthermore, the delivery device 100 may repeat the process at Step S18 every time the delivery device 100 receives the corrected positional information. Namely, once the rough positional information is transmitted by the terminal device 10-x, the processes at Steps S12 to S18 may continuously be repeated after that (for example, once every seconds). Furthermore, the corrected positional information that is obtained every time the processes at Steps S12 to S18 are repeated may be accumulated in the storage unit 220 included in the determination device 200. Moreover, continuously mentioned here may be an arbitrary frequency and is not limited in particular. For example, continuously may be a frequency of once, five times, ten times, or the like every seconds.

Furthermore, the determination device 200 may acquire information (definition information) that defines a flight path of the air vehicle 60. Furthermore, the determination device 200 may judge whether the definition information has been accepted. The definition information may include, for example, information that indicates a target point (start target) that is a start point in which the air vehicle 60 is allowed to start a flight and information that indicates a target point (reach target) in which the air vehicle 60 is allowed to reach. For example, the definition information may include information indicating a direction, a distance, an altitude, an angle, or the like starting from the terminal device 10-x as the origin. Namely, the definition information may define start target and the reach target on the basis of the information on, for example, a direction, a distance, an altitude, an angle, or the like starting from the terminal device 10-x as the origin.

Furthermore, the definition information may include information for prescribing a virtual area in which the air vehicle 60 is allowed to fly in a space in which the air vehicle 60 is able to fly. The virtual area may be a stereoscopic shape or a planar shape and is not particularly limited. Namely, the definition information may define a virtual planar area and spatial area in which the air vehicle 60 is allowed to fly.

For example, if a polygonal area is prescribed, the definition information may include a point corresponding to each of the vertex (vertex point) of the area. Furthermore, for example, if a circular or spherical area is prescribed, the definition information may include information indicating a point of the center of the area (center point) and information indicating the size of the radius. Furthermore, for example, if an area that is a combination of the polygonal area and a circular or spherical area is specified, the definition information may include information that is an appropriate combination of information for specifying these shapes. Furthermore, the definition information may include, for example, information indicating a position of the terminal device 10-x, information indicating an altitude starting from the terminal device 10-x as the origin, and information indicating an altitude of the terminal device 10-x.

The determination device 200 may acquire the definition information via, for example, a terminal device T that can be used to input the definition information. The user U1 may input, as exemplified in FIG. 1, the definition information by using the terminal device T (Step S31). The terminal device T may be an information processing terminal, such as a smartphone. In the terminal device T, an application (hereinafter, referred to as an "app AP") for performing various kinds of control setting related to the air vehicle 60 may be installed. Namely, the determination device 200 may acquire the definition information that is input by the user U1 via the app AP. In other words, for example, if the definition information is input to the app AP, the terminal device T may transmit the definition information to the determination device 200 during an input of the definition information or after the completion of the input of the definition information.

If the determination device 200 receives the definition information from the terminal device T, the determination device 200 may judge that the definition information has been accepted. Then, the determination device 200 may calculate a target point reached by the air vehicle 60 after the flight on the basis of the definition information and the corrected positional information. Namely, the determination device 200 may perform a path determination process for determining the flight path of the air vehicle 60 on the basis of the definition information and the corrected positional information that is acquired at Step S18 (Step S32). Moreover, the user U1 may input, for example, as the target point, a start target point (start target) and the reach target point (reach target) of the air vehicle 60, which are used as the definition information, to the terminal device T.

Here, the corrected positional information acquired by the determination device 200 is obtained by correcting rough positional information on the basis of the known coordinates of the reference station 30 corresponding to the processing target. Consequently, the corrected positional information acquired by the determination device 200 is highly accurate positional information as compared to the rough positional information. Thus, the determination device 200 may calculate the relative position based on the corrected positional information. The determination device 200 may calculate the relative position that satisfies the definition information as the position of the target point. Then, the determination device 200 may calculate an orbit along which the air vehicle 60 flies to the calculated position as a target and determine the orbit as the flight path of the air vehicle 60. Namely, the determination device 200 may calculate the positions of the start target and the reach target on the basis of the corrected positional information and the definition information and determine the orbit that is used for the air vehicle 60 to fly from the start target to the reach target as the flight path. Moreover, the flight path may include and orbit that is used, for example, for the air vehicle 60 to reach the start target from the current location. Furthermore, the flight path may include the orbit that is used, for example, for the air vehicle 60 to leave away from the reach target.

The determination device 200 may calculate the position of the start target on the basis of the latest corrected positional information out of the pieces of accumulated corrected positional information. For example, the determination device 200 may calculate, as the position of the start target, the position that is a relative position based on the position indicated by the latest corrected positional information and that satisfies the definition information. Furthermore, the determination device 200 may calculate, as the position of the reach target, the position that is a relative position based on the position indicated by the latest corrected positional information out of the pieces of accumulated corrected positional information and that satisfies the definition information. Then, the determination device 200 may determine, as the flight path of the air vehicle 60, the orbit for allowing the air vehicle 60 to fly from the start target toward the reach target.

The determination device 200 may transmit the information (path information) that indicates the flight path to the air vehicle 60. Namely, the determination device 200 may instruct the air vehicle 60 to fly along the flight path indicated by the path information (Step S33).

The air vehicle 60 may fly on the basis of the path information. If the air vehicle 60 acquires the path information from, for example, the determination device 200, the air vehicle 60 may perform automatic control of the flight and start the flight toward the start target on the basis of the path information. Furthermore, the air vehicle 60 may perform automatic control of the flight when the air vehicle 60 has reached the start target and fly toward the reach target in accordance with the path indicated by the path information.

As described above, the air vehicle 60 may mount thereon the terminal device 10-x as a positioning module and acquire the corrected positional information that indicates the position of the own air vehicle body as needed. In this case, the air vehicle 60 may fly while comparing the current location that is indicated by the latest corrected positional information with the orbit that is indicated by the acquired path information. Specifically, the air vehicle 60 may compare the current location with the position of the orbit and fly while adjusting the current location so as to fly along the orbit. The air vehicle 60 may fly toward the reach target while adjusting its position so as not to deviate from, for example, the position of the orbit. Moreover, the air vehicle 60 may continuously acquire the corrected positional information.

Conventionally, there may be a case in which it is difficult for an air vehicle, such as a drone, to acquire accurate positional information. In contrast, with a flight control process according to the embodiment, a user is able to provide relatively accurate positional information to the air vehicle 60 by installing the terminal device 10-x at an arbitrary location serving as a reference for, for example, the flight path. Specifically, the user is able to provide relatively accurate positional information to the air vehicle 60 by defining the target point or the like by using the terminal device 10-x as the origin. Namely, the determination device 200 is able to determine a relatively optimum flight path on the basis of the corrected positional information acquired by the terminal device 10-x.

Accordingly, with the flight control process according to the embodiment, the user is able to easily set an accurate target point. Furthermore, the user is able to perform path setting with a high degree of flexibility by using the portable terminal device 10-x. Therefore, with the flight control process according to the embodiment, it is possible to improve usability in path setting.

Moreover, in the example illustrated in FIG. 1, the example in which the corrected positional information obtained by the terminal device 10-x is transmitted to the determination device 200 via the delivery device 100 is illustrated (Steps S17 to S18). However, the corrected positional information acquired by the terminal device 10-x may be directly transmitted from the terminal device 10-x to the determination device 200 (the dotted line arrow).

Furthermore, in each of the examples illustrated in FIG. 1 and FIG. 2, an example in which the delivery device 100 and the determination device 200 are different devices is illustrated. However, the delivery device 100 and the determination device 200 may be integrally configured as a single server device. In such a case, for example, the determination device 200 may be configured such that the function of the delivery device 100 is included.

3. Modification of Path Control Process According to Embodiment

In the embodiment described above, an example of the service (edge service) that performs positioning performed by the terminal device 10-x using the RTK calculation has been described. Here, the service (cloud service) that performs positioning by the delivery device 100 using the RTK calculation may be developed. Namely, the path control process according to the modification is different from the path control process according to the embodiment described above in that the delivery device 100 acquires the corrected positional information by performing the RTK calculation. Specifically, for example, the rough positional information on the terminal device 10-x may be corrected by performing, in the delivery device 100, the RTK calculation using the correction information. In the following, the overall flow of the path control process associated with this type of cloud service will be described as a modification. FIG. 2 illustrates the modification of the path control process according to the embodiment. Moreover, in the modification, content overlapping with the content described above in the embodiment may sometimes be omitted or simplified as needed. Namely, in the modification, a configuration of the components having the same reference numerals as those described above in the embodiment may include the same configuration as that described above in the embodiment.

First, the terminal device 10-x according to the modification need not mount thereon a program for performing positioning using the RTK calculation. Namely, the terminal device 10-x according to the modification may only mount thereon a communication module that performs communication with the GNSS receiver responding to RTK, an antenna, and the delivery device 100 or the determination device 200. Accordingly, the terminal device 10-x according to the modification may simply transmit the detected GNSS signal to the delivery device 100 and it is thus possible to reduce power consumption of the terminal device 10-x and further reduce its size.

The terminal device 10-x may be already installed at an arbitrary location in accordance with the intended use of the user U1. Furthermore, if the power supply of the terminal device 10-x is turned ON, the terminal device 10-x may start to detect the GNSS signal and transmit the detected GNSS signal to the delivery device 100 (Step S21). Furthermore, although not illustrated, the delivery device 100 may calculate the rough positional information on the terminal device 10-x by using the GNSS positioning on the basis of the GNSS signal received from the terminal device 10-x.

If the delivery device 100 acquires the rough positional information, the delivery device 100 may select, on the basis of the rough positional information, the reference station 30 corresponding to the processing target out of the reference stations 30 that are installed in various locations. For example, the delivery device 100 may select, as the reference station 30 corresponding to the processing target, the reference station 30 that is present in the area associated with the position indicated by the rough positional information.

The delivery device 100 may transmit, to the selected reference station 30, a delivery request that is a request to deliver the GNSS signal (Step S22). The reference station 30 corresponding to the processing target may transmit, to the delivery device 100, the GNSS signal that is received when the delivery request is received (Step S23). If the delivery device 100 receives the GNSS signal from the reference station 30 corresponding to the processing target, the delivery device 100 may generate correction information (Step S24).

The delivery device 100 may perform correction calculation that corrects the rough positional information on the basis of the correction information (Step S25). Namely, the delivery device 100 may correct the rough positional information by performing the RTK calculation using the correction information. Namely, the delivery device 100 may calculate the corrected positional information by correcting the rough positional information using the RTK calculation. Consequently, the path control process according to the modification is able to implement positioning with relatively high accuracy. Moreover, the RTK calculation may be performed by using a conventionally known technique.

The delivery device 100 may transmit the corrected positional information to the determination device 200 (Step S26). The determination device 200 may acquire (receive) the corrected positional information from the delivery device 100.

Moreover, after the delivery device 100 has calculated the rough positional information, the processes at Steps S21 (or, Step S22) to S26 may be continuously repeated (for example, once every seconds). Namely, the pieces of corrected positional information may be accumulated in the determination device 200. Moreover, a series of path determination processes at Step S26 and the subsequent processes performed by the determination device 200 is the same as that described above in the embodiment; therefore, descriptions thereof will be omitted.

4. Configuration of Each Device

In the following, a configuration of each of the devices included in the path determination system 1 according to the embodiment will be described with reference to FIG. 3 to FIG. 6.

4-1. Configuration of Terminal Device

Figure 3:
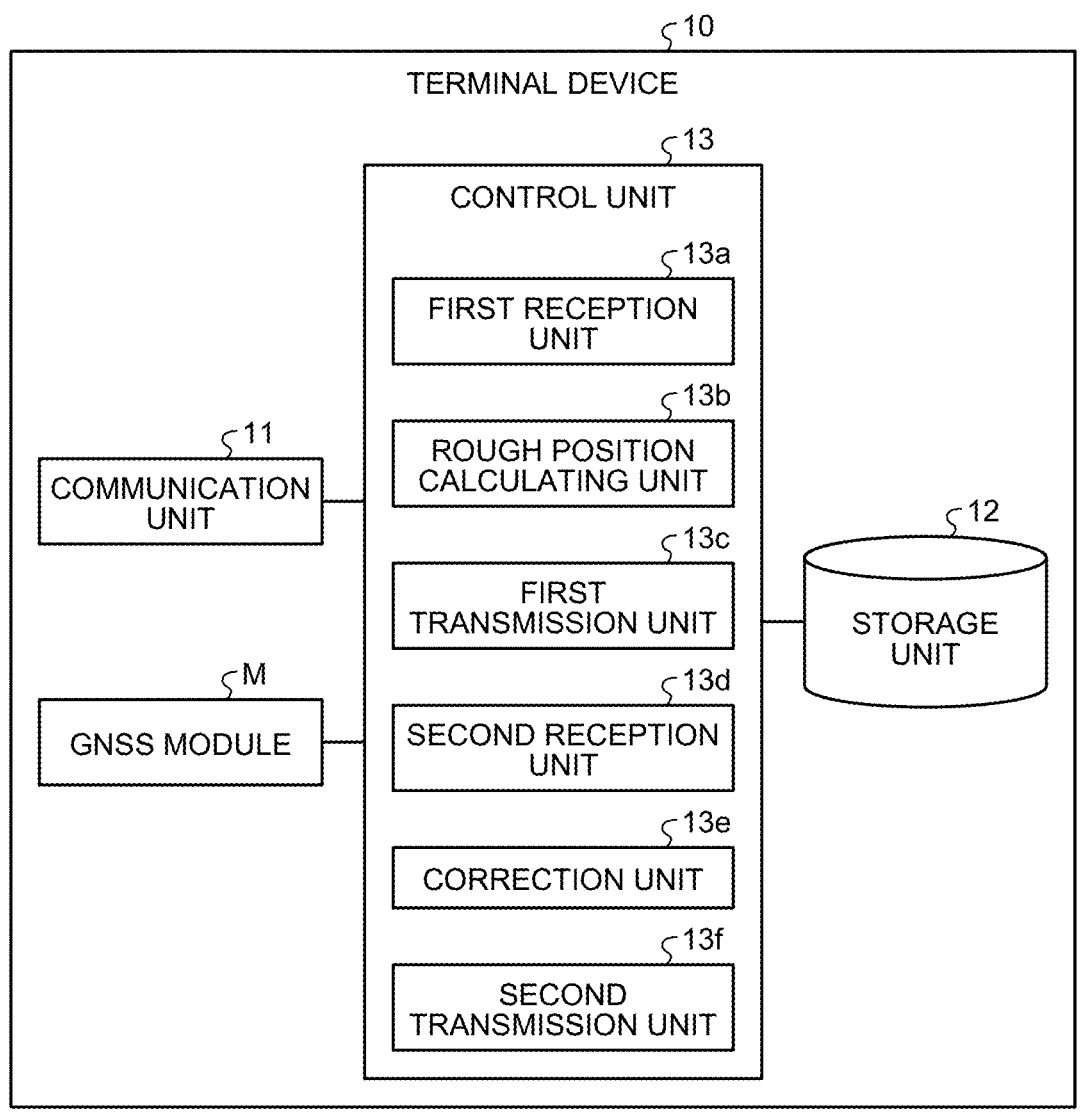
FIG. 3 is a diagram illustrating a configuration example of a terminal device according to an embodiment.

FIG. 3 illustrates a configuration example of the terminal device 10-x according to the embodiment. The terminal device 10-x may include a communication unit 11, a GNSS module M, a storage unit 12, and a control unit 13.
(About Communication Unit 11 and GNSS Module M)

The communication unit 11 may be implemented by, for example, a network interface card (NIC) or the like. The communication unit 11 may be connected to the network N in a wired or wireless manner. The communication unit 11 may transmit and receive information to and from the delivery device 100 and the determination device 200 via, for example, the network N. The GNSS module M is able to receive a GNSS signal. Namely, the GNSS module M may be constituted from an arbitrary part for receiving the GNSS signal.
(About Storage Unit 12)

The storage unit 12 may be implemented by, for example, a semiconductor memory device, such as a random access memory (RAM) or a flash memory, or a storage device, such as a hard disk or an optical disk. The storage unit 12 may store, for example, the rough positional information calculated by a rough position calculating unit 13b, the correction information received from the delivery device 100, and the corrected positional information obtained from the RTK calculation performed by using the correction information.
(About Control Unit 13)

The control unit 13 may be implemented by a central processing unit (CPU), a graphics processing unit (GPU), a micro processing unit (MPU), or the like executing, in a RAM as a work area, various programs that are stored in the storage device inside the terminal device 10-x. Furthermore, the control unit 13 may be implemented by, for example, an integrated circuit, such as an application specific integrated circuit (ASIC) or a field programmable gate array (FPGA).

The control unit 13 may include a first reception unit 13a, the rough position calculating unit 13b, a first transmission unit 13c, a second reception unit 13d, a correction unit 13e, and a second transmission unit 13f. Moreover, an internal configuration of the control unit 13 is not limited to the configuration illustrated in FIG. 3 and another configuration may be used as long as a configuration in which information processing described later is performed is used. Furthermore, the connection relations of the respective processing units included in the control unit 13 are not limited to the connection relations illustrated in FIG. 3 and another connection relation may be used.
(About First Reception Unit 13a)

The first reception unit 13a may correspond to the GNSS receiver responding to RTK and the antenna and receive the GNSS signal. Furthermore, the first reception unit 13a may output the received GNSS signal to the rough position calculating unit 13b.
(About Rough Position Calculating Unit 13b)

A rough position calculating unit 13b may calculate the positional information indicating the position of the own device (installation position) by performing GNSS positioning on the basis of the GNSS signal that is received by the first reception unit 13a. Namely, the rough position calculating unit 13b may calculate the rough positional information by performing GNSS positioning on the basis of the GNSS signal. For example, if the rough position calculating unit 13b detects that the power supply is turned ON, the rough position calculating unit 13b may calculate the rough positional information. The rough position calculating unit 13b may store the rough positional information in the storage unit 12.

(About First Transmission Unit 13c)

The first transmission unit 13c may transmit the rough positional information calculated by the rough position calculating unit 13b to the delivery device 100.

(About Second Reception Unit 13d)

The second reception unit 13d may receive the correction information transmitted from the delivery device 100. Furthermore, the second reception unit 13d may store the correction information in the storage unit 12.

(About Correction Unit 13e)

The correction unit 13e may perform correction calculation that corrects the rough positional information calculated by the rough position calculating unit 13b on the basis of the correction information received by the second reception unit 13d. Namely, the correction unit 13e may correct the rough positional information by performing the RTK calculation using the correction information. Furthermore, the correction unit 13e may store, in the storage unit 12, the positional information (corrected positional information) subjected to correction obtained from the correction calculation.

(About Second Transmission Unit 13f)

The second transmission unit 13f may transmit the corrected positional information obtained from the RTK calculation performed by the correction unit 13e. For example, the second transmission unit 13f may transmit the corrected positional information to the delivery device 100. Moreover, the second transmission unit 13f may directly transmit the corrected positional information to the determination device 200.

4-2. Configuration of Delivery Device

Figure 4:
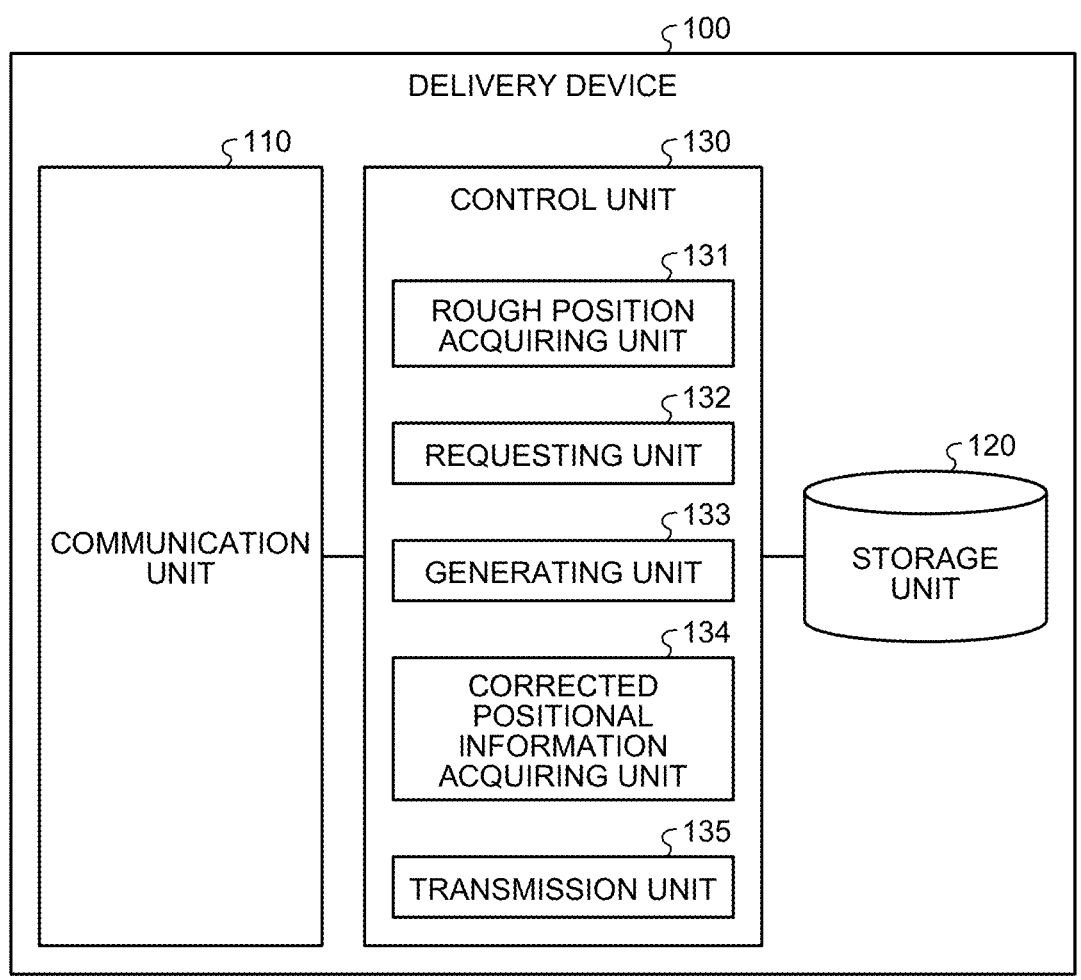
FIG. 4 is a diagram illustrating a configuration example of a delivery device according to the embodiment.

FIG. 4 illustrates a configuration example of the delivery device 100 according to the embodiment. The delivery device 100 may include a communication unit 110, a storage unit 120, and a control unit 130.

(About Communication Unit 110)

The communication unit 110 may be implemented by, for example, a NIC or the like. Then, the communication unit 110 may be connected to the network N in a wired or wireless manner. The communication unit 110 may transmit and receive information to and from, for example, the terminal device 10-x, the reference station 30, and the determination device 200 via the network N.

(About Storage Unit 120)

The storage unit 120 may be implemented by, for example, a semiconductor memory device, such as a RAM or a flash memory, or a storage device, such as a hard disk or an optical disk. The storage unit 120 may store, for example, the correction information generated by a generating unit 133 or the corrected positional information acquired by a corrected positional information acquiring unit 134.

(About Control Unit 130)

The control unit 130 may be implemented by a CPU, a GPU, a MPU, or the like executing, in a RAM as a work area, various programs that are stored in the storage device inside the delivery device 100. Furthermore, the control unit 130 may be implemented by, for example, an integrated circuit, such as an ASIC or a FPGA.

The control unit 130 may include a rough position acquiring unit 131, a requesting unit 132, the generating unit 133, the corrected positional information acquiring unit 134, and a transmission unit 135. Moreover, an internal configuration of the control unit 130 is not limited to the configuration illustrated in FIG. 4 and another configuration may be used as long as a configuration in which information processing described later is performed is used. Furthermore, the connection relations of the respective processing units included in the control unit 130 are not limited to the connection relations illustrated in FIG. 4 and another connection relation may be used.

(About Rough Position Acquiring Unit 131)

The rough position acquiring unit 131 may acquire (receive) the rough positional information transmitted from the first transmission unit 13c included in the terminal device 10-x.

(About Requesting Unit 132)

If the rough positional information is acquired by the rough position acquiring unit 131, the requesting unit 132 may transmit, to the reference station 30, a delivery request that is a request to deliver the GNSS signal. For example, if the rough positional information is acquired by the rough position acquiring unit 131, the requesting unit 132 may select, on the basis of the acquired rough positional information, the reference station 30 corresponding to the processing target out of the reference stations 30 that are installed in various locations. For example, the requesting unit 132 may select, as the reference station 30 corresponding to the processing target, the reference station 30 that is present in the area associated with the position indicated by the rough positional information. Then, the requesting unit 132 may transmit, to the selected reference station 30, a delivery request that is a request to deliver the GNSS signal. Furthermore, the requesting unit 132 is able to also receive the GNSS signal transmitted from the reference station in response to the delivery request.

(About Generating Unit 133)

The generating unit 133 may generate correction information. For example, if the GNSS signal transmitted from the reference station 30 corresponding to the processing target is received by the requesting unit 132, the generating unit 133 may generate the correction information on the basis of the known coordinates of the subject reference station 30 and the GNSS signal received by the requesting unit 132. For example, the generating unit 133 may generate the information on the known coordinates of the reference station 30 and the correction information that includes the information based on the GNSS signal. Furthermore, the generating unit 133 may store the generated correction information in the storage unit 120. Furthermore, the generating unit 133 may transmit the generated correction information to the terminal device 10-x that is the transmission source of the rough positional information.

(About Corrected Positional Information Acquiring Unit 134)

The corrected positional information acquiring unit 134 may acquire the corrected positional information. For example, the corrected positional information acquiring unit 134 may acquire the corrected positional information obtained from the RTK calculation performed on the terminal device 10-x side by using the correction information that is generated by the generating unit 133. The RTK calculation may be performed by the correction unit 13e. Furthermore, the corrected positional information acquiring unit 134 may store the acquired corrected positional information in the storage unit 120.

(About Transmission Unit 135)

The transmission unit 135 may transmit the corrected positional information acquired by the corrected positional information acquiring unit 134 to the determination device 200.

4-3. Configuration of Determination Device

Figure 5:
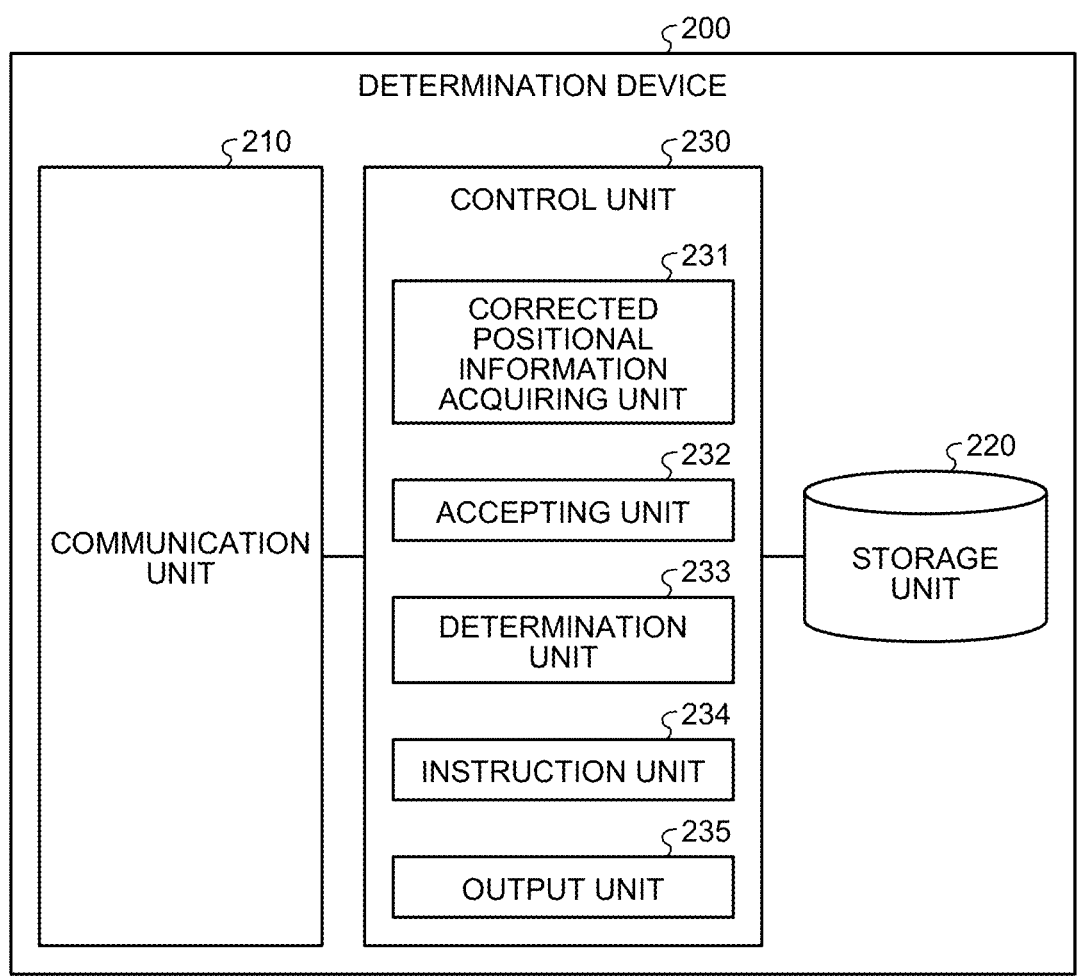
FIG. 5 is a diagram illustrating a configuration example of a determination device according to the embodiment.

FIG. 5 is a diagram illustrating a configuration example of the determination device 200 according to the embodiment. The determination device 200 may include a communication unit 210, the storage unit 220, and a control unit 230.

(About Communication Unit 210)

The communication unit 210 may be implemented by, for example, a NIC or the like. Then, the communication unit 210 may be connected to the network N in a wired or wireless manner. The communication unit 210 may transmit and receive information to and from, for example, the terminal device 10-$x$ and the delivery device 100 via the network N.

(About Storage Unit 220)

The storage unit 220 may be implemented by, for example, a semiconductor memory device, such as a RAM or a flash memory, or a storage device, such as a hard disk or an optical disk. The storage unit 220 may store, for example, the corrected positional information acquired by a corrected positional information acquiring unit 231 or the path information indicating the flight path determined by a determination unit 233.

(About Control Unit 230)

The control unit 230 may be implemented by a CPU, a GPU, a MPU, or the like executing, in a RAM as a work area, various programs (for example, a path determination program according to the embodiment) stored in the storage device inside the determination device 200. Furthermore, the control unit 230 may be implemented by, for example, an integrated circuit, such as an ASIC or a FPGA.

The control unit 230 may include the corrected positional information acquiring unit 231, an accepting unit 232, the determination unit 233, an instruction unit 234, and an output unit 235. Moreover, an internal configuration of the control unit 230 is not limited to the configuration illustrated in FIG. 5 and another configuration may be used as long as a configuration in which information processing described later is performed is used. Furthermore, the connection relations of the respective processing units included in the control unit 230 are not limited to the connection relations illustrated in FIG. 5 and another connection relation may be used.

(About Corrected Positional Information Acquiring Unit 231)

The corrected positional information acquiring unit 231 may acquire the positional information on the terminal device 10-$x$ that is installed at an arbitrary location serving as a reference for the path of the air vehicle. The corrected positional information acquiring unit 231 may acquire the positional information on the terminal device 10-$x$ on the basis of the correction information that is generated by using the known coordinates based on the reference station 30 associated with the area in which the terminal device 10-$x$ is located. The corrected positional information acquiring unit 231 may be an example of an acquiring unit. Furthermore, the corrected positional information acquiring unit 231 may acquire (receive) the corrected positional information transmitted from a transmission unit 136. Furthermore, the corrected positional information acquiring unit 231 may store the acquired corrected positional information in the storage unit 220.

(About Accepting Unit 232)

The accepting unit 232 may accept the definition information that defines a flight path from a user. For example, the accepting unit 232 may acquire the definition information via the app AP. FIG. 1 (the same applies to FIG. 2) exemplifies a case in which the accepting unit 232 accepts the definition information from the user U1.

For example, the accepting unit 232 may accept the definition information in which a target point (for example, a start target or a reach target) for allowing an air vehicle to reach is defined in a state in which a predetermined terminal device 10-$x$ is set as a use target from among the terminal devices 10-$x$. For example, if a "straight line mode" for setting a linear flight path is selected in the app AP, the accepting unit 232 may accept the definition information in which at least two target points (for example, a start target and a reach target) for allowing the air vehicle 60 to reach are defined. Namely, the user U1 may allow the air vehicle 60 to fly the straight line that connects these target points.

Furthermore, the accepting unit 232 may accept the definition information that defines a planar area, in which the air vehicle 60 is allowed to fly in a space in which the air vehicle 60 is able to fly, in a state in which a predetermined terminal device 10-$x$ is set as a use target from among the terminal devices 10-$x$. For example, the accepting unit 232 may accept the definition information in which vertex points corresponding to the respective vertices of the planar area are defined. For example, if a "planar surface mode" that is a mode for generating a planar area is selected in the app AP, the accepting unit 232 may accept the definition information in which the vertex points corresponding to the respective vertices of the planar area are defined. Namely, the user U1 may allow the air vehicle 60 to fly in the planar area.

Furthermore, the accepting unit 232 may accept the definition information in which the vertex points corresponding to the respective vertices of a stereoscopic area in a space are defined in a state in which a predetermined terminal device 10-$x$ is set as a use target from among the terminal devices 10-$x$. For example, if a "stereoscopic mode" that is a mode for generating a stereoscopic area is selected in the app AP, the accepting unit 232 may accept the definition information in which the vertex points corresponding to the respective vertices of the stereoscopic area are defined. Namely, the user U1 may allow the air vehicle 60 to fly in the stereoscopic area.

Moreover, in the examples described above, the "straight line mode", the "planar surface mode", and the "stereoscopic mode" are used as the mode for inputting the definition information to the app AP; however, the modes used in the app AP are not limited to these. For example, in the app AP, definition information on the linear flight path, the planar area, and the stereoscopic area may be input by using a single mode. Namely, the accepting unit 232 may accept the definition information that arbitrarily includes the definition of at least two target points, the definition of each of the vertices of the planar area, and the definition of each of the vertices of the stereoscopic area. In other words, the user U1 may input, to the app AP, the definition information for allowing the air vehicle 60 to arbitrarily fly in the space in which the air vehicle 60 is able to fly. The user U1 may appropriately input, to the app AP, the definition information that is defined in accordance with a movement of the air vehicle 60 and that indicates an instruction to allow the air vehicle 60 to, for example, linearly move from a certain target point to a certain target point, three-dimensionally move in a certain space, horizontally move in a certain plane, or the like.

(About Determination Unit 233)

The determination unit 233 may determine a flight path of an air vehicle on the basis of the positional information acquired by the corrected positional information acquiring unit 231. Specifically, the determination unit 233 may determine the flight path of the air vehicle on the basis of the corrected positional information acquired by the corrected positional information acquiring unit 231 and the definition information accepted by the accepting unit 232.

For example, if the definition information in which the target point is defined by the accepting unit 232 has been accepted, the determination unit 233 may determine the flight path of the air vehicle on the basis of the corrected positional information associated with the terminal device 10-*x* functioning as the use target and the definition information.

For example, a description will be made of a case in which the definition information in which the target point is defined has been accepted in a state in which a single piece of the terminal device 10-*x* is set as the use target. In this case, the determination unit 233 may calculate, as the position of the target point, a position that is a relative position based on the position indicated by the corrected positional information associated with a single piece of the terminal device 10-*x* and that satisfies the definition information. The determination unit 233 may determine, as the flight path, the orbit along which the air vehicle is allowed to fly to, for example, the position calculated as the target point. The details thereof will be described later with reference to FIG. 7.

Furthermore, a description will be made of a case in which the definition information in which a start point associated with one of the terminal devices and a reach point associated with the other terminal device are defined has been accepted as the target points in a state in which the two terminal devices 10-*x* are set as the use targets. In this case, the determination unit 233 may calculate, as the positions of the target points, the positions that are the relative positions based on the position indicated by the corrected positional information associated with these terminal devices and that satisfy the definition information. The determination unit 233 may determine, as the flight path, the orbit along which allow the air vehicle is allowed to fly, for example, from the position associated with the start point toward the position associated with the reach point out of the calculated positions. The details will be described later with reference to FIG. 8.

Furthermore, a description will be made of a case in which the definition information in which the vertex points corresponding to the respective vertices of the planar area are defined has been accepted. In this case, the determination unit 233 may generate a planar area that satisfies the definition information on the basis of, for example, the corrected positional information associated with the terminal device 10-*x* functioning as the use target at this time. The determination unit 233 may determine a flight path of an air vehicle on the basis of, for example, the generated planar area. For example, the determination unit 233 may calculate, as vertex points, the positions that are the relative positions based on the position indicated by the corrected positional information associated with the terminal device 10-*x* functioning as the use target and that satisfy the definition information. The determination unit 233 may generate a planar area in which the calculated vertex points are set as vertices. Furthermore, the determination unit 233 may determine, as a flight path in accordance with the definition information, a trajectory along which the air vehicle is allowed to move in the generated planar area. The details will be described later with reference to FIG. 10.

Furthermore, a description will be made of a case in which the definition information in which the vertex points corresponding to the respective vertices of the stereoscopic area are defined has been accepted. In this case, by generating a stereoscopic area that satisfies the definition information on the basis of the corrected positional information associated with at least two terminal devices functioning as the use targets at this time, the determination unit 233 may determine a flight path of an air vehicle on the basis of the generated stereoscopic area. For example, the determination unit 233 may calculate, as vertex points, the positions that are the relative positions on the basis of the position indicated by the corrected positional information associated with the two terminal devices functioning as the use targets and that satisfy the definition information. The determination unit 233 may generate a stereoscopic area in which, for example, the calculated vertex points are set as vertices. Furthermore, the determination unit 233 may determine, as the flight path, a trajectory along which the air vehicle is allowed to move in a predetermined planar area included in a planar area constituting the generated stereoscopic area in accordance with the definition information. Furthermore, the determination unit 233 may determine, as the flight path, the trajectory along which the air vehicle is allowed to move in the stereoscopic area so as not to move out from the stereoscopic area in accordance with the definition information. Furthermore, the determination unit 233 may determine, as the flight path, the trajectory along which the air vehicle is allowed to move outside the stereoscopic area so as not to enter the stereoscopic area in accordance with the definition information. The details will be described later with reference to FIG. 11 to FIG. 16.

Furthermore, the determination unit 233 may store the path information indicating the determined flight path in the storage unit 220.

(About Instruction Unit 234)

The instruction unit 234 may instruct the air vehicle 60 functioning the processing target to fly the flight path determined by the determination unit 233. Namely, the instruction unit 234 may transmit, to the air vehicle 60, path information indicating, for example, the flight path determined by the determination unit 233.

(About Output Unit 235)

The output unit 235 may output predetermined information to a user of the air vehicle 60 based on whether the air vehicle 60 corresponding to the processing target is flying along the path determined by the determination unit 233. For example, if it is judged that the air vehicle 60 corresponding to the processing target is flying along a path that deviates from the flight path determined by the determination unit 233, the output unit 235 may output information indicating that the air vehicle 60 deviates from the subject flight path.

4-4. Configuration of Air Vehicle Device

Figure 6:
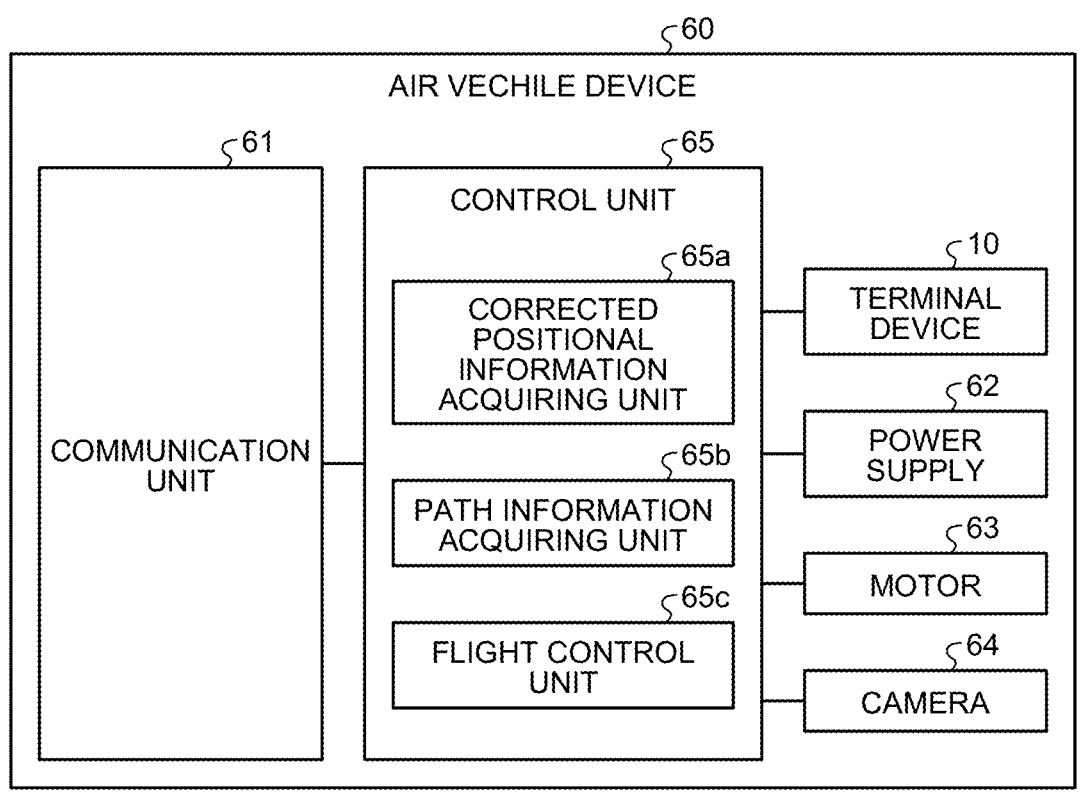
FIG. 6 is a diagram illustrating a configuration example of an air vehicle device according to the embodiment.

FIG. 6 is a diagram illustrating a configuration example of an air vehicle device 60 according to the embodiment. The air vehicle device 60 may include a terminal device 10, a communication unit 61, a power supply 62, a motor 63, and a camera 64.

(About Terminal Device 10)

The air vehicle 60 may mount thereon a positioning module that performs positioning the own vehicle by performing the RTK calculation using the correction information delivered from the delivery device 100. The air vehicle 60 may mount thereon, for example, the terminal device 10-x (the terminal device 10) as the positioning module.

(About Communication Unit 61)

The communication unit 61 may be implemented by, for example, a NIC or the like. Then, the communication unit 61 may be connected to the network N in a wired or wireless manner. The communication unit 61 may transmit and receive information to and from, for example, the terminal device T, such as a smartphone, used by a user or the determination device 200 via the network N. The communication unit 61 may transmit and receive information to and from the delivery device 100 or the determination device 200 instead of the communication unit 11 included in the terminal device 10-x.

(About Power Supply 62)

The power supply 62 may be a lithium-ion battery. The power supply 62 is able to supply power to each unit included in the air vehicle 60.

(About Motor 63)

The motor 63 is able to rotate each propeller (not illustrated) held by the air vehicle 60. Furthermore, the air vehicle device 60 may include a motor controller that controls rotation of the motor 63.

(About Camera 64)

The camera 64 may include, for example, and imaging element and an illumination device. The imaging element may be an optical sensor that outputs a signal in accordance with emitted light. The imaging element may be, for example, an optical using a complementary metal oxide semiconductor (CMOS) or a charge coupled device (CCD). The illumination device is able to emit light to an imaging area.

(About Control Unit 65)

A control unit 65 may be implemented by a CPU, a GPU, a MPU, or the like executing, in a RAM as a work area, various programs stored in the storage device inside the air vehicle device 60. Furthermore, the control unit 65 may be implemented by, for example, an integrated circuit, such as an ASIC or a FPGA.

The control unit 65 may include a corrected positional information acquiring unit 65a, a path information acquiring unit 65b, and a flight control unit 65c. Moreover, an internal configuration of the control unit 65 is not limited to the configuration illustrated in FIG. 6 and another configuration may be used as long as a configuration in which information processing described later is performed is used. Furthermore, the connection relations of the respective processing units included in the control unit 65 are not limited to the connection relations illustrated in FIG. 6 and another connection relation may be used.

(About Corrected Positional Information Acquiring Unit 65a)

The corrected positional information acquiring unit 65a may acquire corrected positional information obtained from the RTK calculation performed by the correction unit 13e included in the terminal device 10.

(About Path Information Acquiring Unit 65b)

The path information acquiring unit 65b may acquire (receive) the path information transmitted from the instruction unit 234 included in the determination device 200.

(About Flight Control Unit 65c)

The flight control unit 65c is able to control a flight of the air vehicle 60. For example, the flight control unit 65c may control the flight of the air vehicle 60 on the basis of the path information acquired by the path information acquiring unit 65b. For example, the flight control unit 65c may control the flight of the air vehicle 60 on the basis of the corrected positional information acquired by the corrected positional information acquiring unit 65a and the path information acquired by the path information acquiring unit 65b. For example, the flight control unit 65c may control the flight of the air vehicle 60 so as to fly toward the target point while comparing the current location indicated by the latest corrected positional information with the position of the orbit indicated by the acquired path information and performing adjustment such that the air vehicle 60 does not deviate from the orbit.

5. About Path Determination Process

The path determination process performed by the determination device 200 (in particular, the determination unit 233) will be described. A user may install the terminal device 10-x at an arbitrary location. The user is able to define the installed terminal device 10-x as the use target. For example, the user is able to set a flight path of an air vehicle in accordance with a purpose. The user may install an arbitrary number of the terminal devices 10-x at arbitrary locations in accordance with the purpose. Furthermore, the user is able to input the definition information that defines the flight path of the air vehicle to the determination device 200. FIG. 7 to FIG. 16 illustrate examples of variations of the installation method (installation mode) of installing the terminal device 10-x and examples of definition information that can be input in accordance with the variations. Furthermore, FIG. 7 to FIG. 16 each illustrate an example of the path determination process performed on the basis of the input definition information.

Moreover, the variations and the definition information stated in the installation method indicated in the following examples are only examples and the user is able to perform various kinds of installation or input in accordance with the purpose. Furthermore, the path determination process according to the embodiment is not limited to the examples described below. Moreover, in FIG. 7 to FIG. 16, values indicating a direction, a distance, and an altitude are indicated by using reference numerals "N71" to "N141"; however, an arbitrary value may be used in accordance with the situation or the intended use. Namely, the path determination process according to the embodiment may apply an arbitrary value in accordance with content of the definition information. Furthermore, in a description below, regarding the direction, the distance, and the altitude indicated by the reference numerals "N71" to "N141", for the purpose of convenience, for example, specific direction, distance, and altitude are used for an explanation, such as "a height of 10 m right above in the sky"; however, the definition information defined by the user U1 is not limited to this. Namely, the user U1 may define a target point by using arbitrary direction, distance, and altitude.

5-1. Path Determination Process (1)

Figure 7:
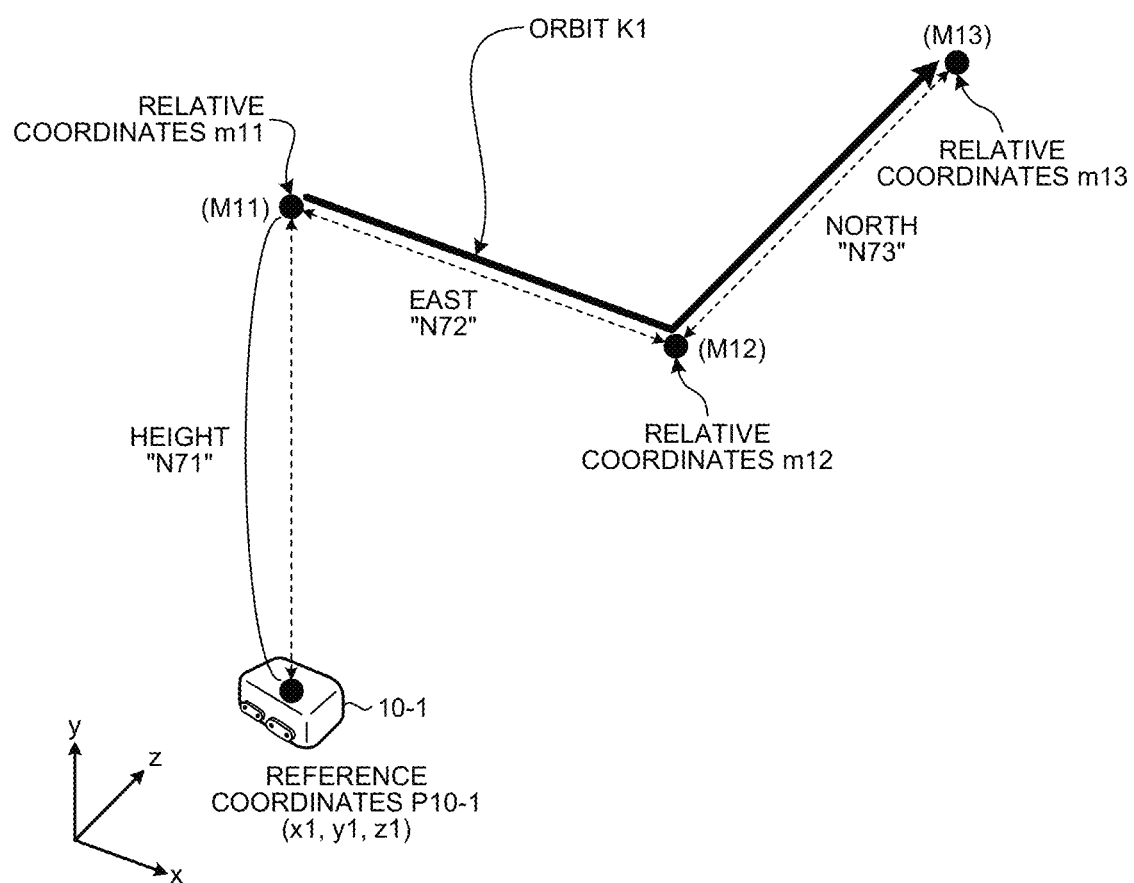
FIG. 7 is a diagram (1) illustrating an example of a path determination process according to the embodiment.

FIG. 7 is a diagram (1) illustrating an example of the path determination process according to the embodiment. FIG. 7 exemplifies a case in which a single piece of the terminal device 10-1 is set to be a use target by installing the terminal device 10-1 at a target position. Namely, by installing the single terminal device 10-1 at the target position, the user U1 may input the definition information on a linear flight path starting from the terminal device 10-1 as the origin to the determination device 200 in a state in which the terminal device 10-1 is set to be the use target.

The user U1 may input, to the determination device 200, the definition information that defines the target point on the flight path by using a direction, a distance, and an altitude starting from, for example, the terminal device 10-1 as a start point. Specifically, the user U1 may input the definition information that defines the target point on the flight path by using a direction, a distance, and an altitude to the determination device 200 indicating, for example, ["the point at a height of 10 m right above in the sky (corresponding to N71)" from the terminal device 10-1 (a target point M11), "the point at 3 m to the east (corresponding to N72)" from the target point M11 (a target point M12), and "the point at 5 m to the north (corresponding to N73)" from the target point M12 (a target point M13)]. The accepting unit 232 in the determination device 200 may accept the input definition information.

Moreover, it is assumed to input this type of definition information in a case where the user has the purpose of, for example, capturing an image of a specific area from above in the sky along a specific orbit, or spraying agricultural chemicals in specific area from above in the sky along a specific orbit.

Furthermore, here, in response to the state in which the terminal device 10-1 is installed at the target position by the user U1, the corrected positional information acquiring unit 231 may acquire the corrected positional information associated with the terminal device 10-1 from the delivery device 100.

Furthermore, the determination unit 233 may calculate, as a position of the target point M11, the position that is a relative position based on the position indicated by, for example, the corrected positional information associated with the terminal device 10-1 (reference coordinates P10-1) and that satisfies a state corresponding to ["the point at a height of 10 m right above in the sky" with respect to the terminal device 10-1]. For example, the determination unit 233 may define the relative coordinates m11 as the position of the target point M11 by calculating the relative coordinates m11 on the basis of the reference coordinates P10-1 at "x1,y1,z1" and a height of "10 m".

Furthermore, the determination unit 233 may calculate, as the position of the target point M12, the position that is the relative position based on the position indicated by, for example, the corrected positional information associated with the terminal device 10-1 (the reference coordinates P10-1) and that satisfies a state corresponding to ["the point at a height of 10 m right above in the sky" with respect to the terminal device 10-1, and furthermore, "a point at 3 m to the east from that point"]. For example, the determination unit 233 may define the relative coordinates m12 as the position of the target point M12 by calculating the relative coordinates m12 on the basis of the reference coordinates P10-1 at "x1,y1,z1", a height of "10 m", and "3 m to the east".

Furthermore, the determination unit 233 may calculate, as the position of the target point M13, the position that is the relative position based on the position indicated by, for example, the corrected positional information associated with the terminal device 10-1 (the reference coordinates P10-1) and that satisfies a state corresponding to ["the point at a height of 10 m right above in the sky" with respect to the terminal device 10-1; furthermore, "the point at 3 m to the east from that point"; and furthermore, and in addition, a "point at 5 m to the north from that point"]. For example, the determination unit 233 may define the relative coordinates m13 as the position of the target point M13 by calculating the relative coordinates m13 on the basis of the reference coordinates P10-1 at "x1,y1,z1", a height of "10 m", "3 m to the east", and "5 m to the north".

Furthermore, the determination unit 233 may determine, as the flight path, a linear orbit K1 by combining, for example, a straight line orbit in which a vector is directed from the target point M11 toward the target point M12 and a straight line orbit in which a vector is directed from the target point M12 toward the target point M13. Then, by inputting the path information indicating the orbit K1 to the air vehicle 60, the determination unit 233 may instruct the air vehicle 60 to fly along a straight line from the target point M11 (the start target) to the target point M13 (the reach target) via the target point M12.

Moreover, by defining the position (the reference coordinates P10-1) in which the terminal device 10-1 is installed as a start target and defining the target point M12 as a reach target, the user is able to set a flight path so as to make a flight starting from the position in which the terminal device 10-1 is installed to the target point M12 on a straight line at an angle. Furthermore, by defining a direction, a distance, and an angle with respect to the position (the reference coordinates P10-1) in which the terminal device 10-1 is installed, the user is able to set the flight path so as to make a flight starting from the position in which the terminal device 10-1 is installed toward, for example, the target point M12 on a straight line at an angle.

Furthermore, by defining a center point and a radius, the user is able to set a circular flight path. In the example illustrated in FIG. 7, the user is able to set a circular flight path by defining the target point M11 as the center of a circle and defining the distance between the target point M11 and target point M12. Furthermore, for example, by defining the target point M13 as a start target and also defining a direction and an altitude with respect to the target point M13, a user is also able to set a flight path so as to make a brief flight to the target point M13, and then, make a flight moving on a straight line in a state in which a specific direction and altitude are maintained from that point.

Here, the user may allow the air vehicle 60 to take off from the point in which the terminal device 10-x is installed. Namely, the air vehicle 60 may take off from the position in which, for example, the terminal device 10-1 is installed and fly to the target point M11. Then, the air vehicle 60 may fly from the target point M11 to reach the target point M13.

Furthermore, the user may also allow the air vehicle 60 to take off from a position located at a predetermined distance from the position in which the terminal device 10-x is installed. In this case, the accepting unit 232 may accept the definition information for defining, for example, a takeoff point. For example, the accepting unit 232 may accept the definition information defined by using an element starting from the terminal device 10-1 as the origin, such as an instruction "to set a position 100 m away from the terminal device 10-1 as a takeoff point". Namely, the air vehicle 60 is able to take off from the takeoff point and fly toward the target point M11. Then, the air vehicle 60 may fly from the target point M11 to reach the target point M13. Moreover, after having reached the target point M13, the air vehicle 60 may return the takeoff point and land on the ground.

Moreover, after having reached the target point M13, the air vehicle 60 may land at an arbitrary point. The air vehicle 60 may land at, for example, a takeoff point. The air vehicle

60 may land at, for example, a location in which the terminal device 10-1 is installed. The air vehicle 60 may land at, for example, a dedicated station in which the air vehicle 60 is stored. The air vehicle 60 may land at, for example, an arbitrary point designated by the user.

Then, the determination unit 233 may determine a takeoff point, in which the air vehicle 60 is allowed to take off toward the flight path, on the basis of the corrected positional information associated with the terminal device 10-x corresponding to the use target.

For example, the determination unit 233 may calculate, as a position of a takeoff point, the position that is the relative position based on the position indicated by the corrected positional information associated with the terminal device 10-x and that satisfies the definition information in which the takeoff point is defined. The determination unit 233 may give an instruction to take off from the calculated position toward the flight path. In this case, the air vehicle 60 may briefly fly from, for example, the current location to the takeoff point, and then, land at the takeoff point. After that, the air vehicle 60 may take off toward the target point (for example, the start target) included in the flight path.

5-2. Path Determination Process (2)

Figure 8:
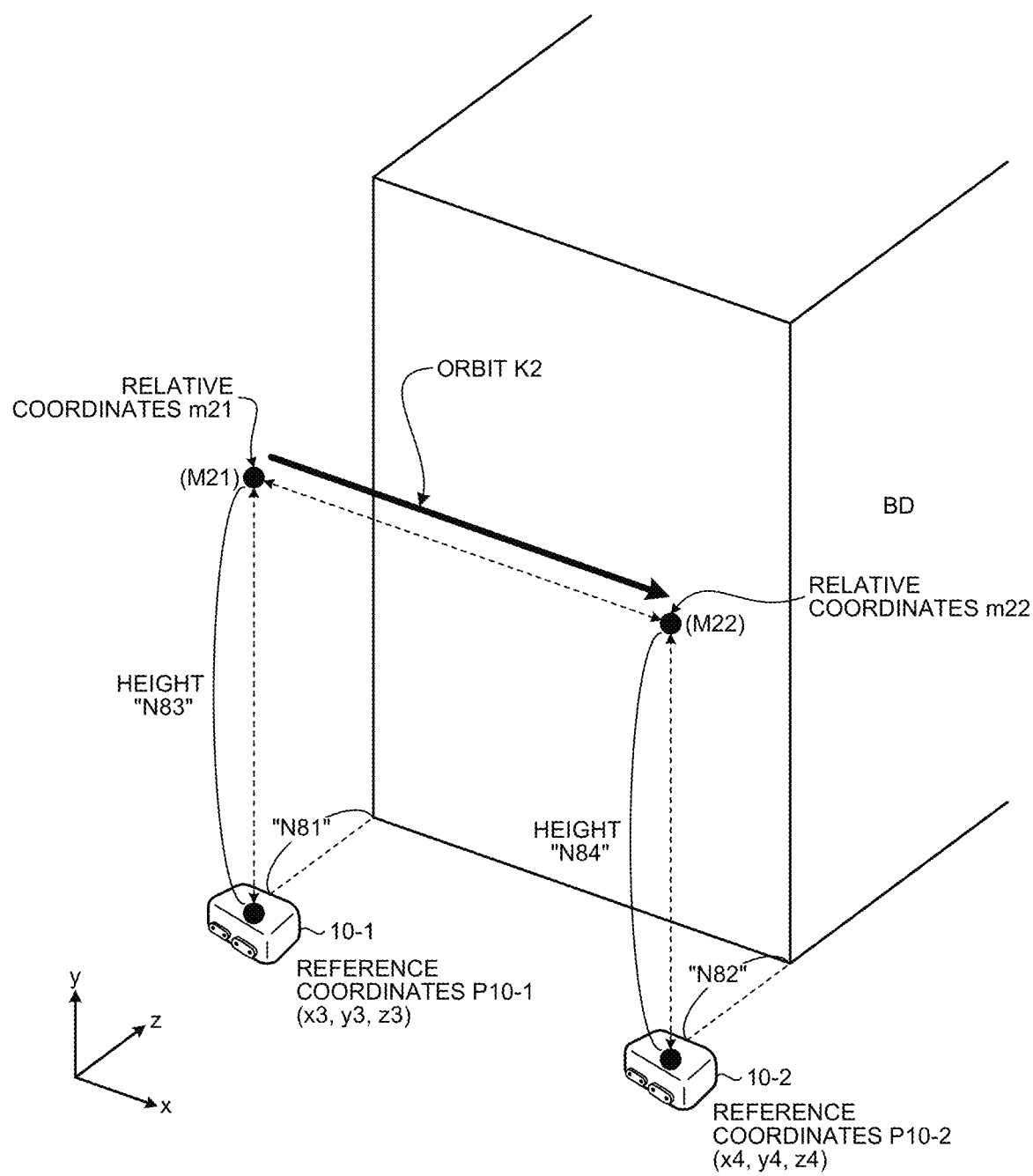
FIG. 8 is a diagram (2) illustrating an example of a path determination process according to the embodiment.

FIG. 8 is a diagram (2) illustrating an example of the path determination process according to the embodiment. FIG. 8 exemplifies a case in which, in accordance with the purpose of inspecting a wall surface associated with a predetermined floor of the building object BD, the user U1 installs the terminal device 10-1 at one end of the building object BD on the ground associated with the subject wall surface and installs the terminal device 10-2 at the other end thereof. For example, the user U1 may install the terminal device 10-1 at a point positioned 3 m away from one end of the building object BD (corresponding to N81) on the ground and install the terminal device 10-2 at a point positioned 3 m away from the other end of the building object BD (corresponding to N82) on the ground. Namely, in a state in which, for example, the terminal devices 10-1 and 10-2 are set as the use targets, the user U1 may input the definition information for defining the linear flight path starting from these terminal device as the origins to the determination device 200.

Specifically, the user U1 may input the definition information that defines the target point on the flight path by using a direction and an altitude to the determination device 200 indicating an instruction to, for example, [fly from "the point at a height of 10 m in the sky (corresponding to N83)" (a target point M21) with respect to the terminal device 10-1 to "the point at a height of 10 m in the sky (corresponding to N84)" (a target point M22) with respect to the terminal device 10-2]. In such a case, the accepting unit 232 in the determination device 200 may accept the definition information.

Furthermore, here, in response to a state in which the terminal device 10-1 has been installed at the target position by the user U1, the corrected positional information acquiring unit 231 may acquire the corrected positional information associated with the terminal device 10-1 from the delivery device 100. Furthermore, in response to the state in which the terminal device 10-2 has been installed at the target position by the user U1, the corrected positional information acquiring unit 231 may acquire the corrected positional information associated with the terminal device 10-2 from the delivery device 100.

Furthermore, the determination unit 233 may calculate, as the positions of the target points, the positions that are the relative positions based on the pieces of corrected positional information associated with the two respective terminal devices 10-x (reference coordinates) and that satisfy the definition information. Specifically, the determination unit 233 may calculate the relative coordinates m21 on the basis of, for example, the reference coordinates P10-1 at "x3,y3, z3" associated with the terminal device 10-1 and a height of "10 m". Then, the determination unit 233 may define the calculated relative coordinates m21 as the position of the target point M21. Furthermore, the determination unit 233 may calculate the relative coordinates m22 on the basis of, for example, reference coordinates P10-2 at "x4,y4,z4" associated with the terminal device 10-2 and a height of "10 m". Then, the determination unit 233 may define the calculated relative coordinates m22 as the position of a target point M22.

Furthermore, the determination unit 233 may determine, as a flight path, an orbit K2 that is a straight line orbit in which a vector is directed from the target point M21 toward the target point M22. Then, the determination unit 233 may input path information indicating the orbit K2 to the air vehicle 60. Namely, the determination unit 233 may instruct the air vehicle 60 to fly along a straight line from the target point M21 (the start target) to the target point M22 (the reach target).

5-3. Path Determination Process (3)

Figure 9:
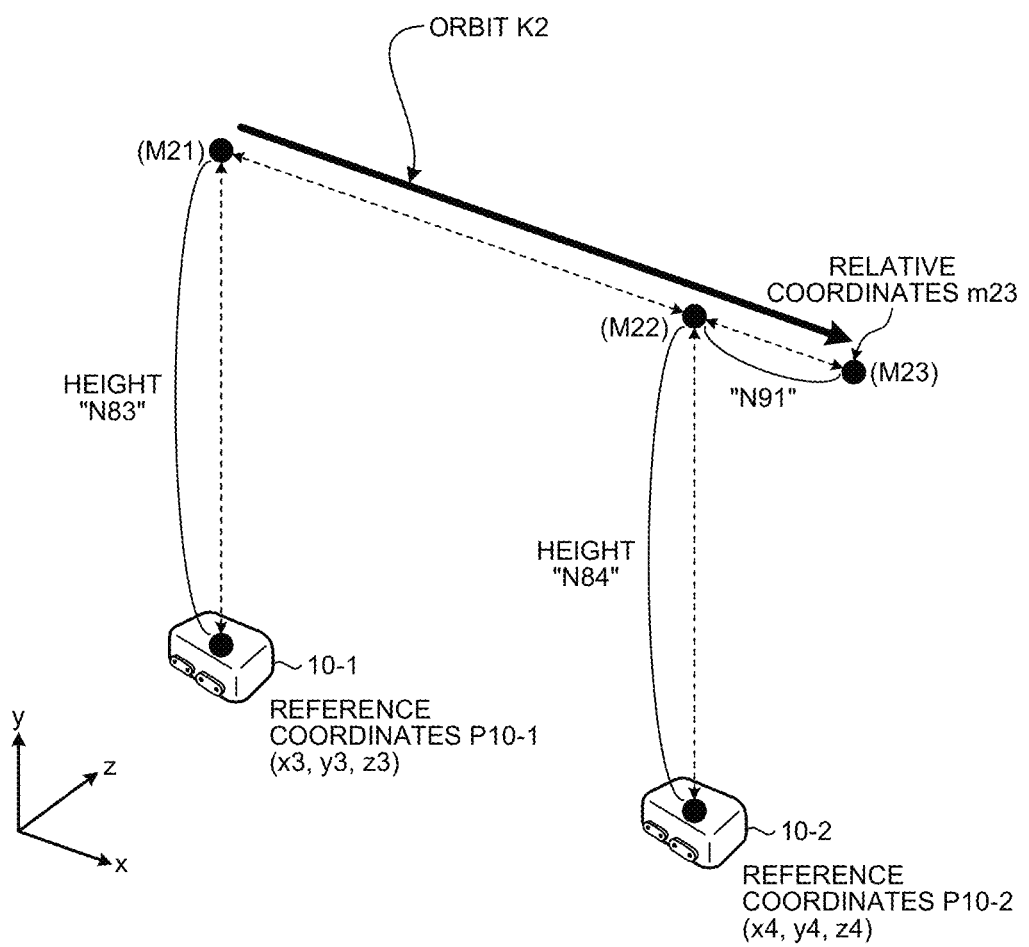
FIG. 9 is a diagram (3) illustrating an example of a path determination process according to the embodiment.

In FIG. 8, an example in which the definition information is input such that a line segment connecting the points positioned above the two respective terminal devices 10-x in the sky is set as a flight path has been indicated. However, the user U1 is able to input the definition information such that the flight path that further extends the line segment connecting the points positioned above the two terminal devices 10-x in the sky by an amount corresponding to a predetermined distance. FIG. 9 illustrates an example of this type of definition information and an example of the path determination process performed on the basis of the subject definition information as a modification of the example associated with FIG. 8. FIG. 9 is a diagram (3) illustrating an example of the path determination process according to the embodiment.

For example, as the definition information for setting the flight path so as to further extend by an amount corresponding to the predetermined distance, the user U1 may input, to the determination device 200, the definition information indicating an instruction to [further extend "the point at a height of 10 m in the sky" (the target point M22) with respect to the terminal device 10-2 to "the point at a distance of 5 m (corresponding to N91)" (the target point M23) from the target point M22]. In this case, the accepting unit 232 in the determination device 200 may accept the definition information.

Furthermore, the determination unit 233 may calculate the positional information on the basis of the vector (direction) pointing from the target point M21 to the target point M22 and the reference coordinates P10-2 at "x4,y4,z4". The determination unit 233 may calculate the relative coordinates m23 on the basis of, for example, the positional information indicating the position of the target point M21 and the extended distance of "5 m". Then, the determination unit 233 may define the relative coordinates m23 as the position of the target point M23.

Furthermore, the determination unit 233 may define, as the flight path, a linear orbit K21 in which a vector is directed from the target point M21 toward the target point M23. Then, the determination unit 233 may input the path information that indicates the orbit K21 to the air vehicle 60. Namely, the determination unit 233 may instruct the air vehicle 60 to fly along a straight line from the target point M21 (the start target) to the target point M23 (the reach target) via the target point M22.

5-4. Path Determination Process (4)

Figure 10:
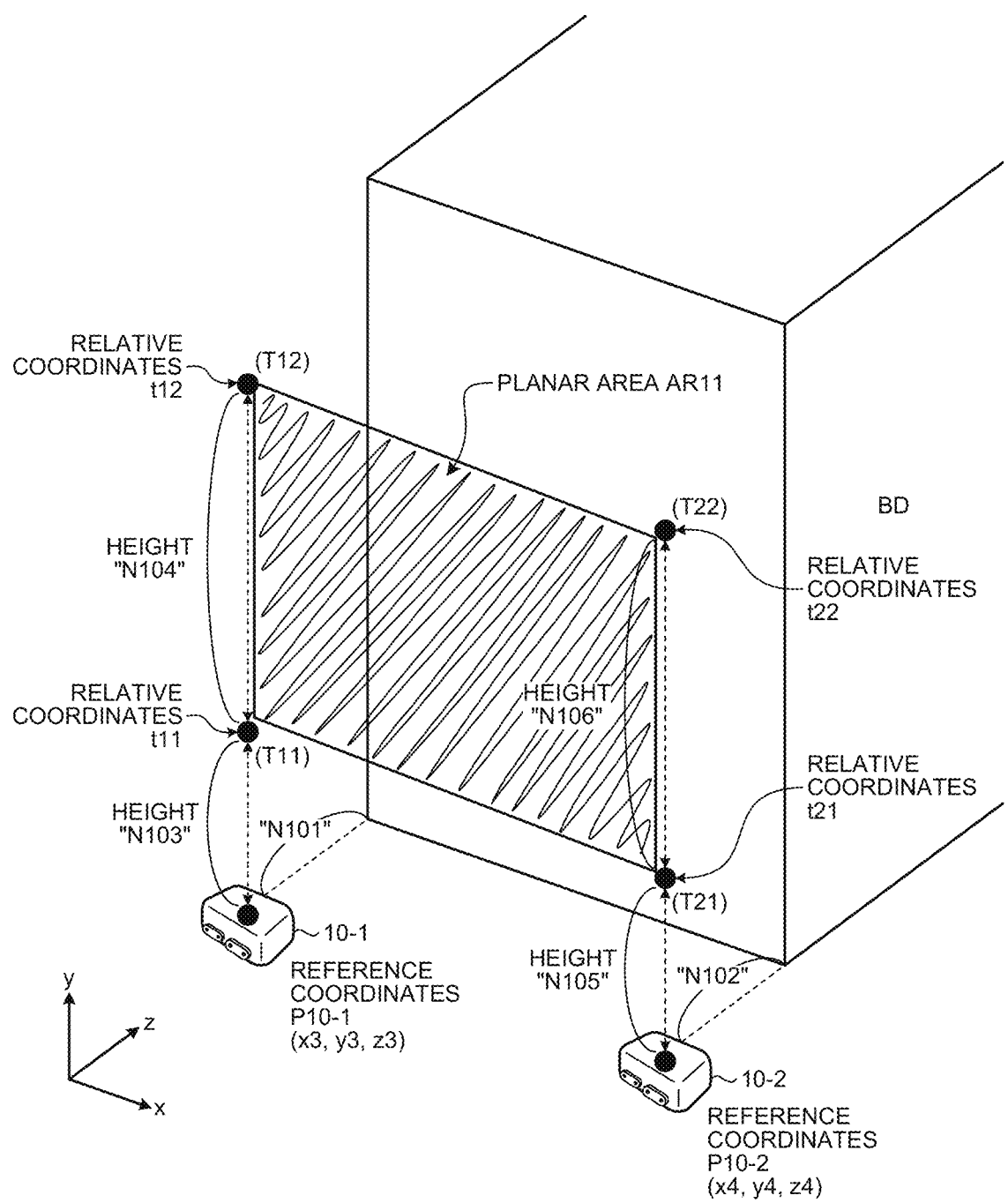
FIG. 10 is a diagram (4) illustrating an example of a path determination process according to the embodiment.

FIG. 10 is a diagram (4) illustrating an example of the path determination process according to the embodiment. In the example illustrated in FIG. 10, a case in which, in accordance with the purpose of evenly inspecting a wall surface associated with, for example, the $2^{nd}$ to the $5^{th}$ floors of the building object BD, the user U1 installs the terminal device 10-1 at one end of the building object BD on the ground associated with the subject wall surface and installs the terminal device 10-2 at the other end thereof is exemplified. For example, the user U1 may install the terminal device 10-1 at a point positioned 3 m away from one end of the building object BD (corresponding to N101) on the ground and install the terminal device 10-2 at a point positioned 3 m away from the other end of the building object BD (corresponding to N102) on the ground. Namely, in a state in which, for example, the terminal devices 10-1 and 10-2 are set as the use targets, the user U1 may input, to the determination device 200, the definition information for defining the vertex points corresponding to the respective vertices of the planar area starting from these terminal devices as the origins.

Specifically, the user U1 may input, to the determination device 200, definition information 1 indicating an instruction to, for example, [define "the point at a height of 5 m in the sky (corresponding to N103)" with respect to the position of the terminal device 10-1 as a single vertex (a vertex point T11) and define "the point at a height of 15 m in the sky (corresponding to N104)" with respect to the terminal device 10-1 as a single vertex (a vertex point T12)]. Furthermore, the user U1 may input, to the determination device 200, definition information 2 indicating an instruction to [define "the point at a height of 5 m in the sky (corresponding to N105)" with respect to the position of the terminal device 10-2 as a single vertex (a vertex point T21) and define "the point at a height of 15 m in the sky (corresponding to N106)" with respect to the terminal device 10-2 as a single vertex (the vertex point T22). Furthermore, the user U1 may input, to the determination device 200, definition information 3 indicating an instruction to [connect the four vertex points defined by the pieces of definition information 1 and 2 and define as a planar area]. The accepting unit 232 in the determination device 200 may receive the series of pieces of definition information.

Furthermore, here, in response to the state in which the terminal device 10-1 has been installed at the target position by the user U1, the corrected positional information acquiring unit 231 may acquire the corrected positional information associated with the terminal device 10-1 from the delivery device 100. Furthermore, in response to the state in which the terminal device 10-2 has been installed at the target position by the user U1, the corrected positional information acquiring unit 231 may acquire the corrected positional information associated with the terminal device 10-2 from the delivery device 100.

Furthermore, the determination unit 233 may calculate, as the positions of the vertex points, the positions that are the relative positions based on the pieces of corrected positional information associated with the two respective terminal devices 10-x (reference coordinates) and that satisfy the definition information 1 to 3.

Specifically, the determination unit 233 may calculate relative coordinates t11 on the basis of, for example, the reference coordinates P10-1 at "x3,y3,z3" associated with the terminal device 10-1 and a height of "5 m". Then, the determination unit 233 may define the relative coordinates t11 as the position of the vertex point T11. Furthermore, the determination unit 233 may calculate the relative coordinates t12 on the basis of, for example, the reference coordinates P10-1 at "x3,y3,z3" associated with the terminal device 10-1 and a height of "15 m". Then, the determination unit 233 may define the relative coordinates t12 as the position of the vertex point T12. Furthermore, the determination unit 233 may calculate relative coordinates t21 on the basis of, for example, the reference coordinates P10-2 at "x4,y4,z4" associated with the terminal device 10-2 and a height of "5 m". Then, the determination unit 233 may define the relative coordinates t21 as the position of the vertex point T21. Furthermore, the determination unit 233 may calculate the relative coordinates t22 on the basis of, for example, the reference coordinates P10-2 at "x4,y4,z4" associated with the terminal device 10-2 and a height of "15 m". Then, the determination unit 233 may define the relative coordinates t22 as the position of the vertex point T22.

Furthermore, the determination unit 233 may generate a planar area AR11 by connecting the four defined vertex points T11, T12, T21, and T22. For example, the determination unit 233 may determine a trajectory moving along the planar area AR11 in the planar area AR11 as a flight path. Furthermore, the determination unit 233 may input path information indicating the determined flight path to the air vehicle 60. Namely, the determination unit 233 may instruct the air vehicle 60 to uniformly move in the planar area AR11. Moreover, if the air vehicle 60 flies along the flight path while capturing an image, the determination unit 233 may also determine a flight path by using a lap rate of the captured images. For example, the determination unit 233 may calculate a lap rate with respect to the traveling direction and a lap rate with respect to an adjacent portions and determine a flight path such that images to be captured correspond to the lap rate.

5-5. Path Determination Process (5)

Figure 11:
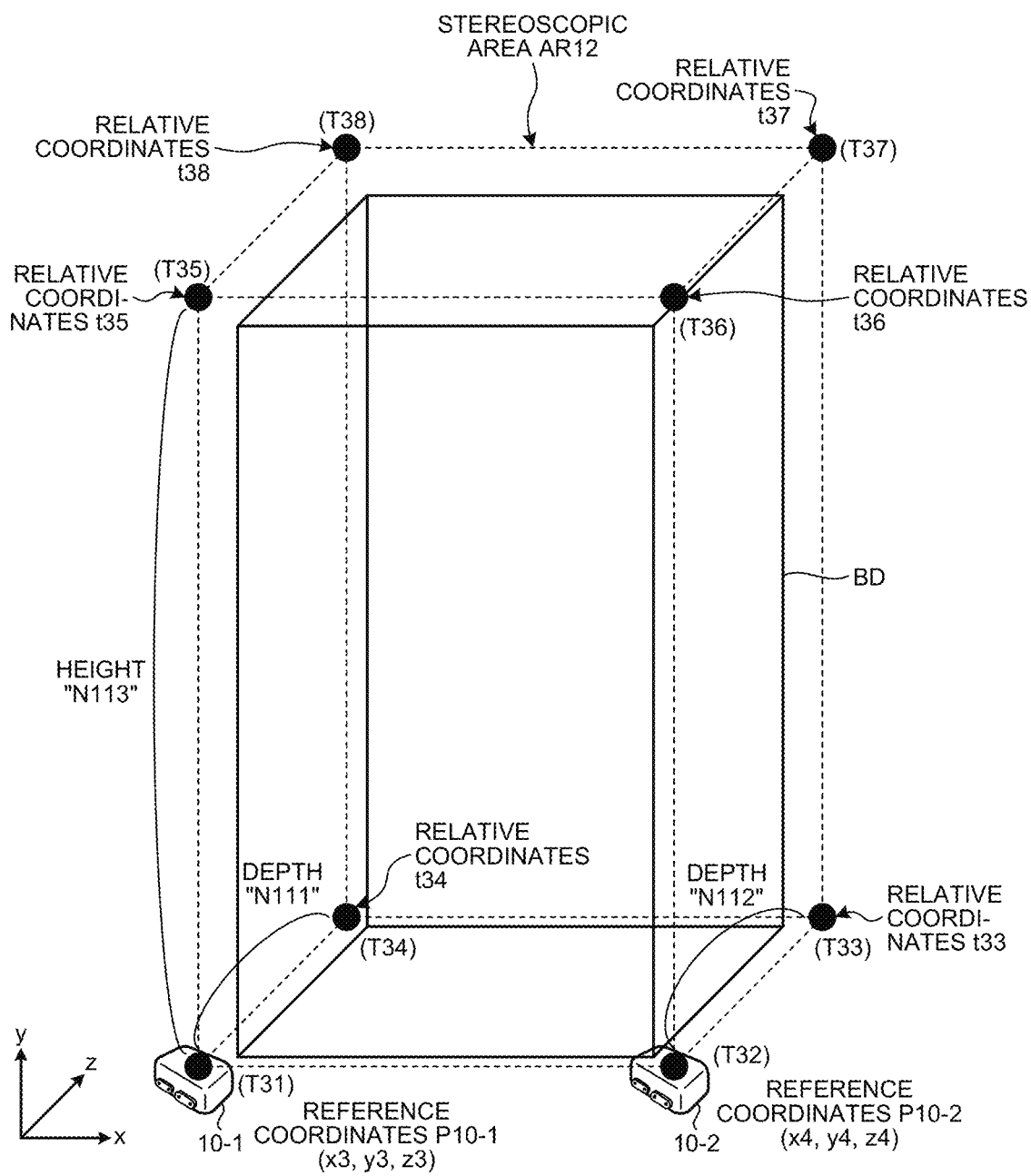
FIG. 11 is a diagram (5) illustrating an example of a path determination process according to the embodiment.

FIG. 11 is a diagram (5) illustrating an example of the path determination process according to the embodiment. In the example illustrated in FIG. 11, a case in which, in accordance with the purpose of allowing the air vehicle 60 to fly in a stereoscopic area surrounding the building object BD in a predetermined mode, the user U1 installs the terminal device 10-1 at one end of the building object BD on the ground and installs the terminal device 10-2 at the other end thereof is exemplified. For example, the user U1 may install the terminal device 10-1 at the point positioned 3 m away from one end of the building object BD on the ground and install the terminal device 10-2 at the point positioned 3 m at the other end of the building object BD on the ground. Namely, in a state in which, for example, the terminal devices 10-1 and 10-2 are set as the use targets, the user U1 may input, to the determination device 200, the definition information for defining the vertex points corresponding to the respective vertices of the stereoscopic area starting from these terminal devices as the origins.

Specifically, the user U1 may input, to the determination device 200, the definition information 1 indicating an instruction to, for example, [define the position of the terminal device 10-1 as a single vertex (a vertex point T31) and define "the point at a depth of 10 m (corresponding to N111)" with respect to the terminal device 10-1 as a single vertex (a vertex point T34)]. Furthermore, the user U1 may input, to the determination device 200, the definition information 2 indicating an instruction to, for example, [define the position of the terminal device 10-2 as a single vertex (a vertex point T32) and define "the point at a depth of 10 m (corresponding to N112)" with respect to the terminal device 10-2 as a single vertex (a vertex point T33)]. Furthermore, the user U1 may input, to the determination device 200, definition information 3 indicating, for example, [a stereoscopic area with a height of "30 m" (corresponding to N113) having a bottom surface corresponding to a surface obtained by connecting the vertex points T31 to T34]. The accepting unit 232 in the determination device 200 may accept the series of the pieces of definition information.

Furthermore, here, in response to the state in which the terminal device 10-1 has been installed at the target position by the user U1, the corrected positional information acquiring unit 231 may acquire the corrected positional information associated with the terminal device 10-1 from the delivery device 100. Furthermore, in response to the state in which the terminal device 10-2 has been installed at the target position by the user U1, the corrected positional information acquiring unit 231 may acquire the corrected positional information associated with the terminal device 10-2 from the delivery device 100.

Furthermore, the determination unit 233 may calculate, as the positions of the vertex points, the positions that satisfy the pieces of definition information 1 and 2 on the basis of the pieces of corrected positional information associated with the two respective terminal devices 10-x (reference coordinates).

Specifically, the determination unit 233 may define, for example, the reference coordinates P10-1 at "x3,y3,z3" associated with the terminal device 10-1 as the position of the vertex point T31. Furthermore, the determination unit 233 may calculate the relative coordinates t34 on the basis of, for example, the reference coordinates P10-1 at "x3,y3,z3" associated with the terminal device 10-1 and a depth of "10 m". Then, the determination unit 233 may define the relative coordinates t34 as the position of the vertex point T34. Furthermore, the determination unit 233 may define, for example, the reference coordinates P10-2 at "x4,y4,z4" associated with the terminal device 10-2 as the position of the vertex point T32. Furthermore, the determination unit 233 may define, for example, the relative coordinates t33 as the position of the vertex point T33 by calculating the relative coordinates t33 on the basis of the reference coordinates P10-2 at "x4,y4,z4" associated with the terminal device 10-2 and a depth of "10 m".

Furthermore, the determination unit 233 may calculate, as the positions of the vertex points, the positions that are the relative positions based on the pieces of corrected positional information associated with the two respective terminal devices 10-x (reference coordinates) and that satisfy the definition information 3. For example, the determination unit 233 may calculate the four remaining vertex points (vertex points T35 to T38) associated with a height of "30 m" in a case where the surface obtained by connecting the vertex points T31 to T34 is assumed to be the bottom surface.

For example, the determination unit 233 may calculate relative coordinates t35 and t38 on the basis of the reference coordinates P10-1 at "x3,y3,z3" associated with the terminal device 10-1, a depth of "10 m", and a height of "30 m". Furthermore, the determination unit 233 may define the relative coordinates t35 as the position of the vertex point T35 and define the relative coordinates t38 as the position of the vertex point T38. Furthermore, for example, the determination unit 233 may calculate relative coordinates t36 and t37 on the basis of the reference coordinates P10-2 at "x4,y4,z4" associated with the terminal device 10-2, a depth of "10 m", and a height of "30 m". Then, the determination unit 233 may define, for example, the relative coordinates t36 as the position of the vertex point T36 and define the relative coordinates t37 as the position of the vertex point T37.

Furthermore, the determination unit 233 may generate a stereoscopic area AR12 by connecting the eight defined vertex points T31 to T38.

Furthermore, the determination unit 233 may determine a flight path on the basis of the stereoscopic area AR12. The determination unit 233 may determine a trajectory of an air vehicle moving along a predetermined planar area (for example, the planar area obtained by connecting the vertex points T31, T32, T35, and T36) included in the planar area constituting, for example, the stereoscopic area AR12. Furthermore, for example, the determination unit 233 may determine, as a flight path, a trajectory of the air vehicle 60 moving outside the stereoscopic area AR12 such that the air vehicle 60 does not enter the stereoscopic area AR12. Furthermore, for example, the determination unit 233 may determine, as a flight path, a trajectory of the air vehicle moving inside the stereoscopic area AR12 such that the air vehicle does not move out from the stereoscopic area AR12.

Moreover, in the example illustrated in FIG. 11, the determination unit 233 generates a so-called cuboid stereoscopic area in a space on the basis of the definition information defined by the user U1. However, the user may define a stereoscopic area having an arbitrary shape on the basis of the definition information in accordance with the intended use. Namely, the user is able to cause the determination unit 233 to generate a stereoscopic area with various shapes in accordance with a condition of, for example, how many of the terminal devices 10-x are to be installed with what positional relationships, what height is to be defined, or the like. In other words, the determination unit 233 may generate a stereoscopic area having an arbitrary shape on the basis of the definition information. For example, in the example illustrated in FIG. 11, the determination unit 233 is able to generate a cubic stereoscopic area in a space depending on a height. Furthermore, for example, if a total of six vertex points are defined by using three vertex points corresponding to the vertex points T31, T32, and T33 (may also be the vertex point T34) and the height, the determination unit 233 is able to generate a stereoscopic area having a triangular prism shape in a space.

5-6. Path Determination Process (6)

Figure 12:
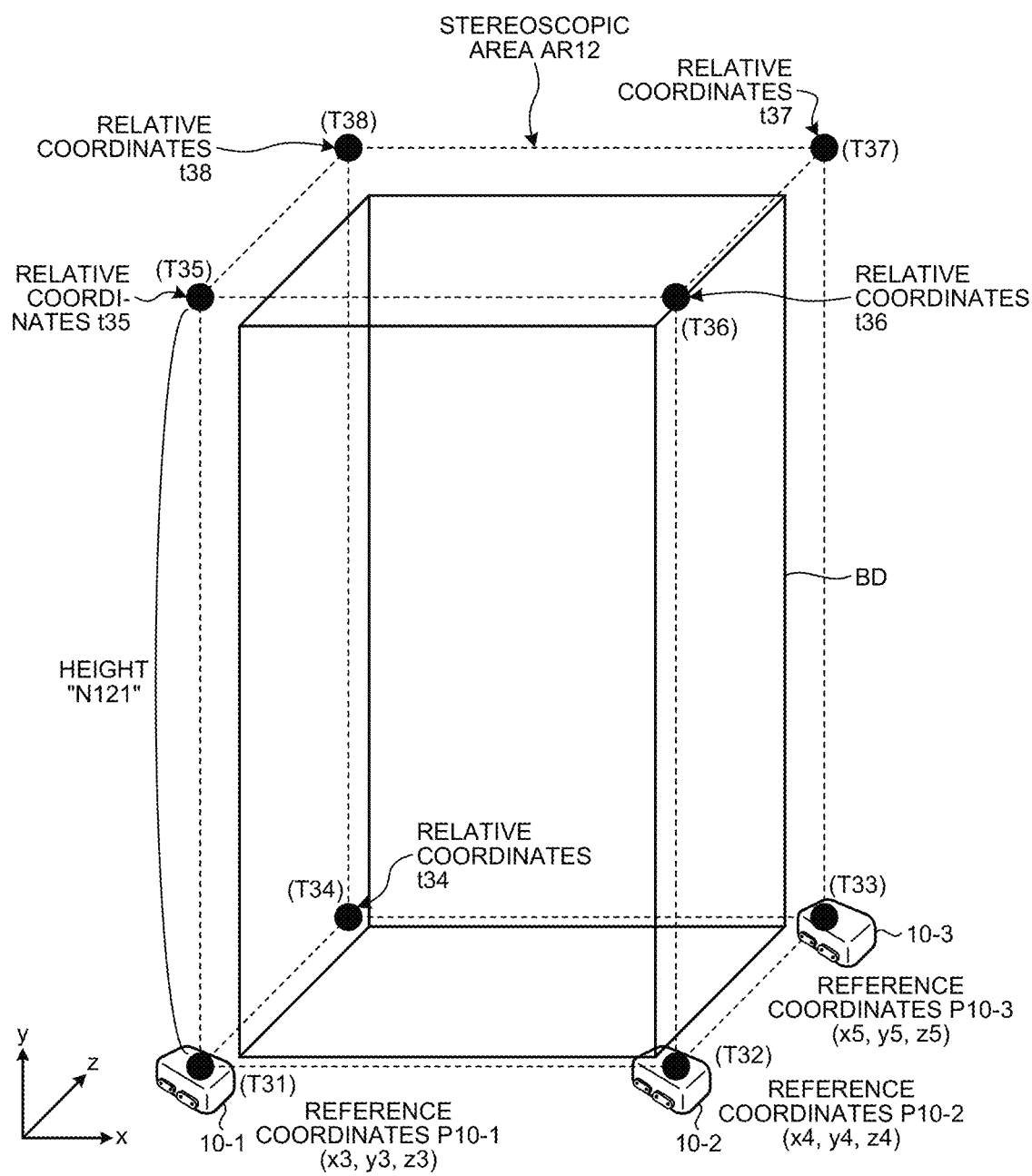
FIG. 12 is a diagram (6) illustrating an example of a path determination process according to the embodiment.

FIG. 12 is a diagram (6) illustrating an example of the path determination process according to the embodiment. FIG. 12 exemplifies a case in which, in accordance with the purpose of allowing the air vehicle 60 to fly in a stereoscopic area surrounding the building object BD in a predetermined mode, the user U1 installs the terminal device 10-1, the terminal device 10-2, and a terminal device 10-3 at three ends of the building object BD on the ground. The example illustrated in FIG. 12 is different from the example illustrated in FIG. 11 in that the terminal device 10-3 is further installed at another end of the building object BD on the ground. Namely, the user U1 may assign, for example, the terminal devices 10-1 to 10-3 to the respective points of origin in a state in which these terminal devices are set as the use targets and input, to the determination device 200, the definition information for defining the vertex points corresponding to the respective vertices of the stereoscopic area.

Specifically, the user U1 may input, to the determination device 200, the definition information 1 indicating an instruction to, for example, [define the position of the terminal device 10-1 as a single vertex (the vertex point T31)]. Furthermore, the user U1 may input, to the determination device 200, the definition information 2 indicating an instruction to, for example, [define the position of the terminal device 10-2 as a single vertex (the vertex point T32)]. Furthermore, the user U1 may input, to the determination device 200, the definition information 3 indicating an instruction to, for example, [define the position of the terminal device 10-3 as a single vertex (the vertex point T33)]. Furthermore, the user U1 may input, to the determination device 200, definition information 4 indicating an instruction to, for example, [further define the position on a diagonal line based on the pieces of definition information 1 to 3 as another single vertex (the vertex point T34)]. Furthermore, the user U1 may input, to the determination device 200, definition information 5 indicating an instruction to, for example, [define a stereoscopic area with a height of "30 m" (corresponding to N121) having a bottom surface corresponding to a surface obtained by connecting the vertex points T31 to T34].

Furthermore, here, in response to the state in which the terminal device 10-1 has been installed at the target position by the user U1, the corrected positional information acquiring unit 231 may acquire the corrected positional information associated with the terminal device 10-1 from the delivery device 100. Furthermore, in response to the state in which the terminal device 10-2 has been installed at the target position by the user U1, the corrected positional information acquiring unit 231 may acquire the corrected positional information associated with the terminal device 10-2 from the delivery device 100. Furthermore, in response to the state in which the terminal device 10-3 has been installed at the target position by the user U1, the corrected positional information acquiring unit 231 may acquire the corrected positional information associated with the terminal device 10-3 from the delivery device 100.

Furthermore, the determination unit 233 may calculate, as the positions of the vertex points, the positions that satisfy the pieces of definition information 1 to 4 on the basis of the pieces of corrected positional information associated with the three respective terminal devices 10-x (reference coordinates) installed on the ground.

Specifically, the determination unit 233 may define, for example, the reference coordinates P10-1 at "x3,y3,z3" associated with the terminal device 10-1 as the position of the vertex point T31. Furthermore, the determination unit 233 may define, for example, the reference coordinates P10-2 at "x4,y4,z4" associated with the terminal device 10-2 as the position of the vertex point T32. Furthermore, the determination unit 233 may define, for example, reference coordinates P10-3 at "x5,y5,z5" associated with the terminal device 10-3 as the position of the vertex point T33. Furthermore, the determination unit 233 may define, for example, the relative coordinates t34 as the position of the vertex point T34 by calculating the relative coordinates t34 on the basis of these three reference coordinates.

Furthermore, the determination unit 233 may calculate, as the positions of the vertex points, the positions the positions indicated by the pieces of corrected positional information associated with the three respective terminal devices 10-x (reference coordinates) installed on the ground 3 and that satisfy the definition information 5. For example, the determination unit 233 may calculate the four remaining vertex points (the vertex points T35 to T38) associated with a height of "30 m" in a case where the surface obtained by connecting the vertex points T31 to T34 is assumed to be the bottom surface.

For example, the determination unit 233 may define the relative coordinates t35 as the position of the vertex point T35 by calculating the relative coordinates t35 on the basis of the reference coordinates P10-1 at "x3,y3,z3" associated with the terminal device 10-1 and a height of "30 m". Furthermore, for example, the determination unit 233 may calculate the relative coordinates t36 on the basis of the reference coordinates P10-2 at "x4,y4,z4" associated with the terminal device 10-2 and a height of "30 m". Then, the determination unit 233 may define the relative coordinates t36 as the position of the vertex point T36. Furthermore, for example, the determination unit 233 may calculate the relative coordinates t37 on the basis of the reference coordinates P10-1 at "x5,y5,z5" associated with the terminal device 10-3 and a height of "30 m". Then, the determination unit 233 may define the relative coordinates t37 as the position of the vertex point T37. Furthermore, for example, the determination unit 233 may calculate the remaining relative coordinates t38 on the basis of the relationship among the relative coordinates t35 to t37. Then, the determination unit 233 may define the relative coordinates t38 as the position of the vertex point T38.

Furthermore, the determination unit 233 may generate the stereoscopic area AR12 by connecting the eight defined vertex points T31 to T38. Furthermore, the determination unit 233 may determine the flight path of the air vehicle in accordance with the definition information defined by the user U1. Moreover, the flight path may be a trajectory similar to the trajectory described in the path determination process (5). Furthermore, the determination unit 233 may input the path information indicating the determined flight path to the air vehicle 60.

5-7. Path Determination Process (7)

Figure 13:
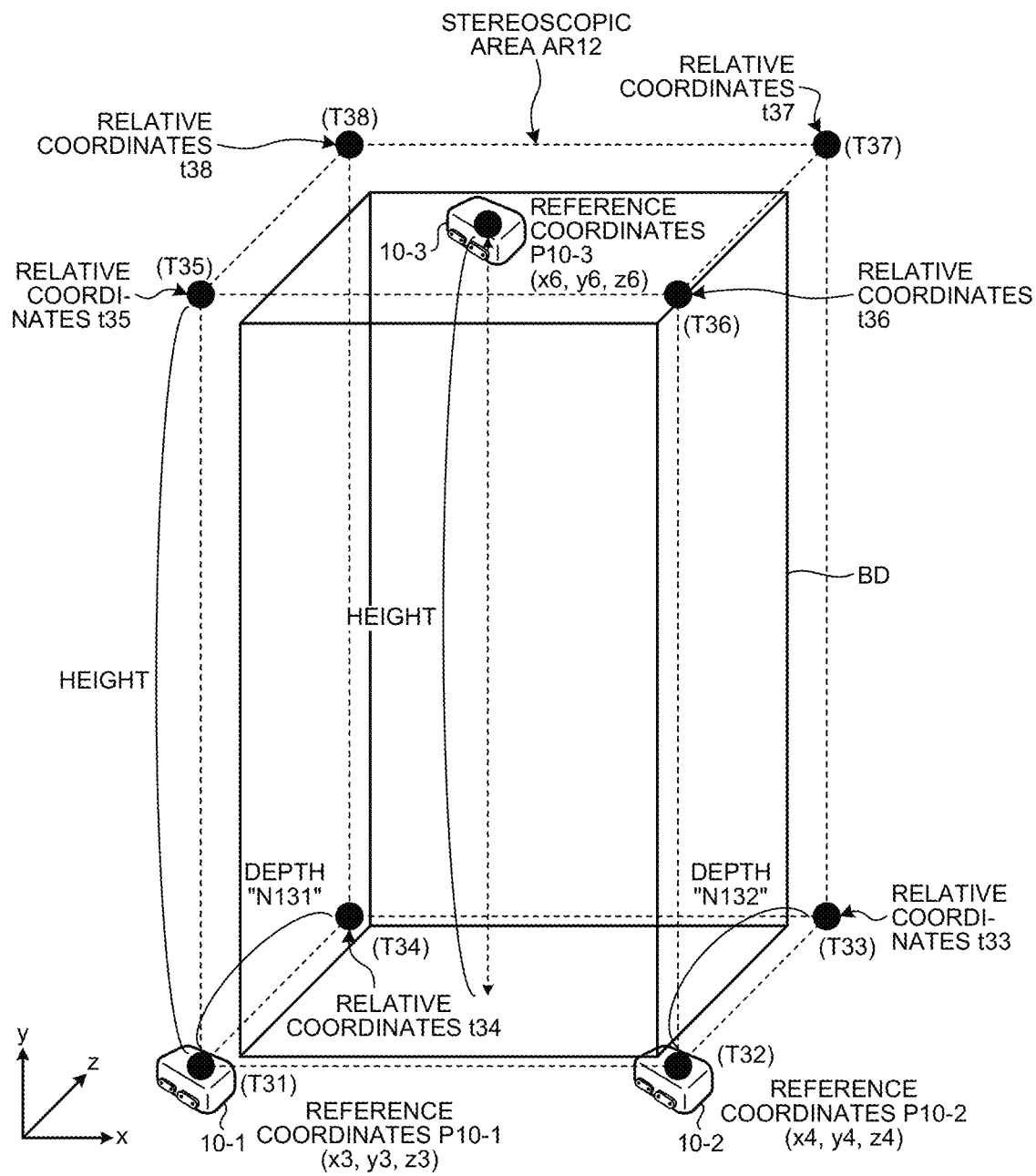
FIG. 13 is a diagram (7) illustrating an example of a path determination process according to the embodiment.

FIG. 13 is a diagram (7) illustrating an example of the path determination process according to the embodiment. FIG. 13 exemplifies a case in which, in accordance with the purpose of allowing the air vehicle 60 to fly in a stereoscopic area surrounding the building object BD in a predetermined mode, the user U1 installs the terminal device 10-1 and the terminal device 10-2 at two respective ends of the building object BD on the ground, and furthermore, installs the terminal device 10-3 on a roof of the building object BD. The example illustrated in FIG. 13 is different from the example illustrated in FIG. 12 in that a different point is used for the point in which the terminal device 10-3 is installed with respect to the building object BD. Specifically, in the example illustrated in FIG. 12, the terminal device 10-3 is installed at one end of the building object BD on the ground such that one of the vertex points is specified, whereas, in the example illustrated in FIG. 13, the terminal device 10-3 is installed on the rooftop of the building object BD such that an altitude is specified. Namely, in a state in which, for example, the terminal devices 10-1 to 10-3 are set as the use targets, the user U1 may input, to the determination device 200, the definition information for defining the vertex points corresponding to the respective vertices of the stereoscopic area starting from these terminal devices as the origin.

Specifically, the user U1 may input, to the determination device 200, the definition information 1 indicating an instruction to, for example, [define the position of the terminal device 10-1 as a single vertex (the vertex point T31) and define "the point at a depth of 10 m (corresponding to N131)" with respect to the terminal device 10-1 as a single vertex (the vertex point T34)]. Furthermore, the user U1 may input, to the determination device 200, the definition information 2 indicating an instruction to, for example, [define the position of the terminal device 10-2 as a single vertex (the vertex point T32) and define "the point at a depth of 10 m (corresponding to N132)" with respect to the terminal device 10-2 as a single vertex (the vertex point T33)]. Furthermore, the user U1 may input, to the determination device 200, the definition information 3 indicating an instruction to, for example, [define a stereoscopic area having a bottom surface corresponding to a surface obtained by connecting the vertex points T31 to T34 and a height corresponding to the position of the terminal device 10-3].

In this case, the determination unit 233 may calculate, as the positions of the vertex points, the positions that satisfy the pieces of the definition information 1 and 2 on the basis of the pieces of corrected positional information associated with the two respective terminal devices 10-*x* (reference coordinates) installed on the ground 2.

Specifically, the determination unit 233 may define, for example, the reference coordinates P10-1 at "x3,y3,z3" associated with the terminal device 10-1 as the position of the vertex point T31. Furthermore, the determination unit 233 may calculate the relative coordinates t34 on the basis of, for example, the reference coordinates P10-1 at "x3,y3,z3" associated with the terminal device 10-1 and a depth of "10 m". Then, the determination unit 233 may define the relative coordinates t34 as the position of the vertex point T34. Furthermore, the determination unit 233 may define, for example, the reference coordinates P10-2 at "x4,y4,z4" associated with the terminal device 10-2 as the position of the vertex point T32. Furthermore, the determination unit 233 may calculate the relative coordinates t33 on the basis of, for example, the reference coordinates P10-2 at "x4,y4,z4" associated with the terminal device 10-2 and a depth of "10 m". Then, the determination unit 233 may define the relative coordinates t33 as the position of the vertex point T33.

Furthermore, the determination unit 233 may calculate, as the positions of the vertex points, the positions that are the relative positions based on the coordinates (reference coordinates) at the positions indicated by the corrected positional information associated with the respective terminal devices 10-*x* and that satisfy the definition information 3. For example, the determination unit 233 may calculate the four remaining vertex points (the vertex points T35 to T38) by applying the height indicated by reference coordinates P10-3 at "x6,y6,z6" associated with the terminal device 10-3 to the surface obtained by connecting the vertex points T31 to T34.

For example, the determination unit 233 may calculate the relative coordinates t35 and t38 on the basis of the reference coordinates P10-1 at "x3,y3,z3" associated with the terminal device 10-1, a depth of "10 m", and the reference coordinates P10-3. Then, the determination unit 233 may define the relative coordinates t35 as the position of the vertex point T35 and define the relative coordinates t38 as the position of the vertex point T38. Furthermore, for example, the determination unit 233 may calculate the relative coordinates t36 and t37 on the basis of the reference coordinates P10-2 at "x4,y4,z4" associated with the terminal device 10-2, a depth of "10 m", and the reference coordinates P10-3. Then, the determination unit 233 may define the relative coordinates t36 as the position of the vertex point T36 and define the relative coordinates t37 as the position of the vertex point T37.

Furthermore, the determination unit 233 may generate the stereoscopic area AR12 by connecting the eight defined vertex points T31 to T38. Furthermore, the determination unit 233 may determine a flight path in accordance with the definition information defined by the user U1. Moreover, the flight path may be a trajectory similar to the trajectory described in the path determination process (5). Furthermore, the determination unit 233 may input the path information indicating the determined flight path to the air vehicle 60.

5-8. Path Determination Process (8)

Figure 14:
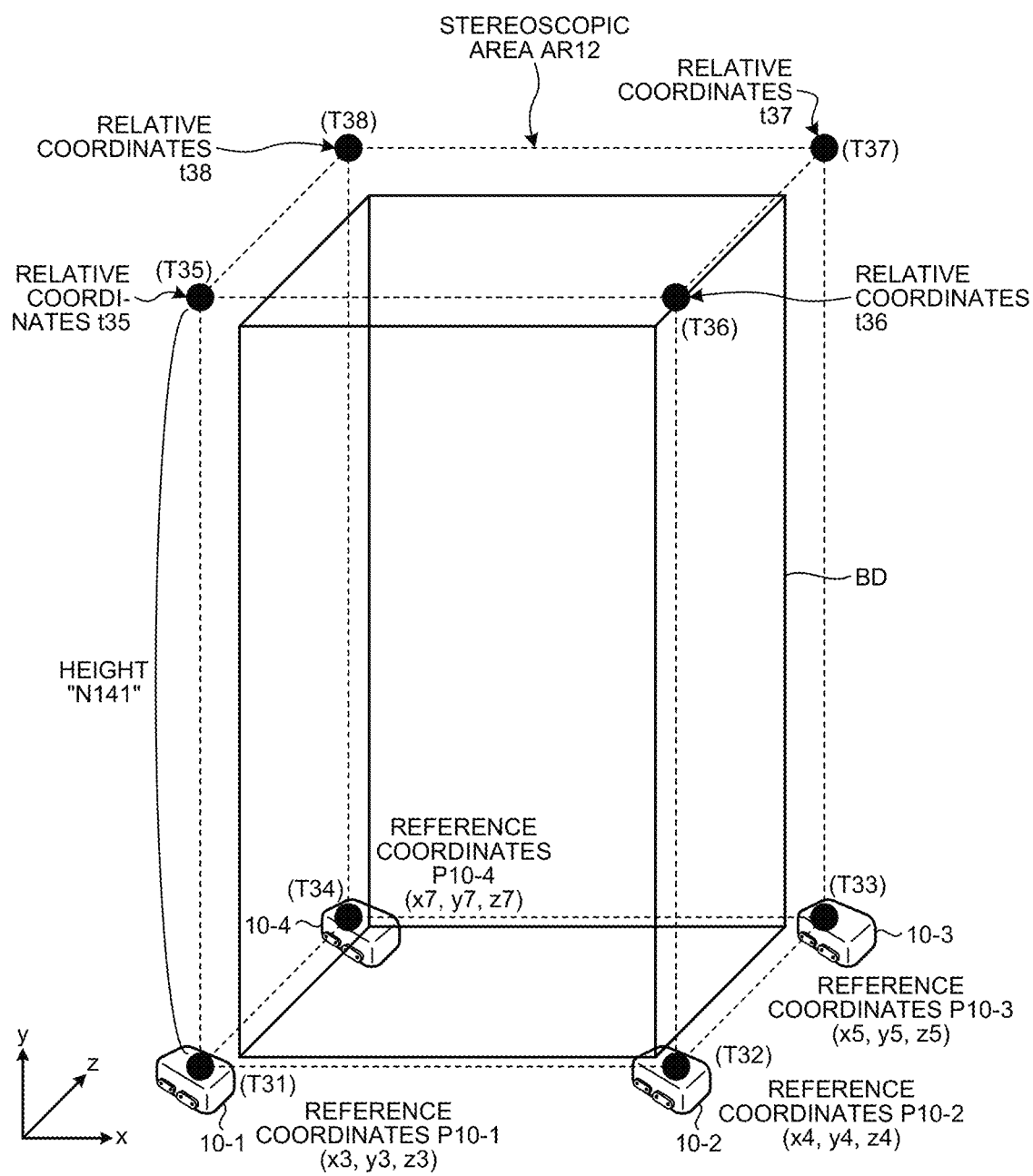
FIG. 14 is a diagram (8) illustrating an example of a path determination process according to the embodiment.

FIG. 14 is a diagram (8) illustrating an example of the path determination process according to the embodiment. FIG. 14 exemplifies a case in which, in accordance with the purpose of allowing the air vehicle 60 to fly in a stereoscopic area surrounding the building object BD in a predetermined mode, the user U1 installs the terminal device 10-1, the terminal device 10-2, the terminal device 10-3, and a terminal device 10-4 at the four respective ends of the building object BD on the ground. In the example illustrated in FIG. 14, as compared to the example illustrated in FIG. 12, another single piece of the terminal device 10-*x* is added (total four). Furthermore, in the example illustrated in FIG. 14, as compared to the example illustrated in FIG. 12, the added single terminal device 10-*x* is further installed at the rest one end of the building object BD. Specifically, in the example illustrated in FIG. 14, the added terminal device 10-4 is installed at the remaining one end of the building object BD. Namely, the user U1 may assign, for example, the terminal devices 10-1 to 10-4 to the respective points of origin in a state in which these terminal devices are set as the use targets and input, to the determination device 200, the definition information for defining the vertex points corresponding to the respective vertices of the stereoscopic area.

Specifically, the user U1 may input, to the determination device 200, the definition information 1 indicating an instruction to, for example, [define the position of the terminal device 10-1 as a single vertex (the vertex point T31)]. Furthermore, the user U1 may input, to the determination device 200, the definition information 2 indicating an instruction to, for example, [define the position of the terminal device 10-2 as a single vertex (the vertex point T32)]. Furthermore, the user U1 may input, to the determination device 200, the definition information 3 indicating an instruction to, for example, [define the position of the terminal device 10-3 as a single vertex (the vertex point T33)]. Furthermore, the user U1 may input, to the determination device 200, the definition information 4 indicating an instruction to, for example, [define the position of the terminal device 10-4 as a single vertex (the vertex point T34)]. Furthermore, the user U1 may input, to the determination device 200, the definition information 5 indicating an instruction to, for example, [define a stereoscopic area with a height of "30 m" (corresponding to N141) having a bottom surface corresponding to a surface obtained by connecting the vertex points T31 to T34].

In this case, the determination unit 233 may calculate, as the positions of the vertex points, the positions that satisfy the pieces of the definition information 1 to 4 based on the pieces of corrected positional information associated with the four respective terminal devices 10-x (reference coordinates) installed on the ground.

Specifically, the determination unit 233 may define, for example, the reference coordinates P10-1 at "x3,y3,z3" associated with the terminal device 10-1 as the position of the vertex point T31. Furthermore, the determination unit 233 may define, for example, the reference coordinates P10-2 at "x4,y4,z4" associated with the terminal device 10-2 as the position of the vertex point T32. Furthermore, the determination unit 233 may define, for example, the reference coordinates P10-3 at "x5,y5,z5" associated with the terminal device 10-3 as the position of the vertex point T33. Furthermore, the determination unit 233 may define, for example, the reference coordinates P10-3 at "x7,y7,z7" associated with the terminal device 10-4 as the position of the vertex point T34.

Furthermore, the determination unit 233 may calculate, as the positions of the vertex points, the positions that are the relative positions based on the pieces of corrected positional information associated with the four respective terminal devices 10-x (reference coordinates) and that satisfy the definition information 5. For example, the determination unit 233 may calculate the four remaining vertex points (vertex points T35 to T38) associated with a height of "30 m" in a case where the surface obtained by connecting the vertex points T31 to T34 is assumed to be the bottom surface.

For example, the determination unit 233 may calculate the relative coordinates t35 on the basis of the reference coordinates P10-1 at "x3,y3,z3" associated with the terminal device 10-1 and a height of "30 m". Then, the determination unit 233 may define the relative coordinates t35 as the position of the vertex point T35. Furthermore, the determination unit 233 may calculate the relative coordinates t36 on the basis of, for example, the reference coordinates P10-2 at "x4,y4,z4" associated with the terminal device 10-2 and a height of "30 m". Then, the determination unit 233 may define the relative coordinates t36 as the position of the vertex point T36. Furthermore, the determination unit 233 may calculate the relative coordinates t37 on the basis of, for example, the reference coordinates P10-3 at "x5,y5,z5" associated with the terminal device 10-3 and a height of "30 m". Then, the determination unit 233 may define the relative coordinates t37 as the position of the vertex point T37. Furthermore, the determination unit 233 may calculate the relative coordinates t38 on the basis of, for example, reference coordinates P10-4 at "x7,y7,z7" associated with the terminal device 10-4 and a height of "30 m". Then, the determination unit 233 may define the relative coordinates t38 as the position of the vertex point T38.

Furthermore, the determination unit 233 may generate the stereoscopic area AR12 by connecting the eight defined vertex points T31 to T38. Furthermore, the determination unit 233 may determine a flight path in accordance with the definition information defined by the user U1. Moreover, the flight path may be a trajectory similar to the trajectory described in the path determination process (5). Furthermore, the determination unit 233 may input the path information indicating the determined flight path to the air vehicle 60.

5-9. Path Determination Process (9)

Figure 15:
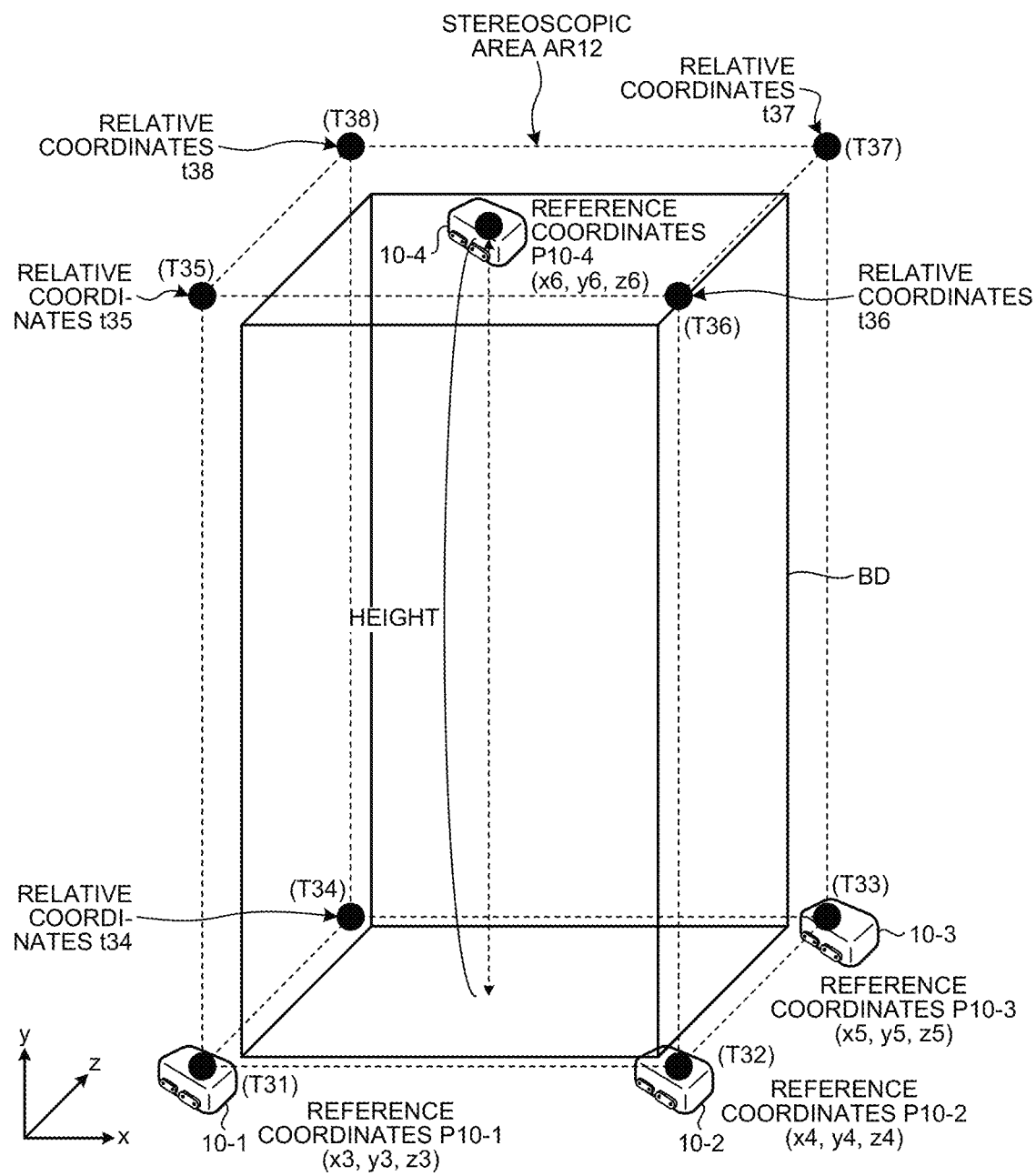
FIG. 15 is a diagram (9) illustrating an example of a path determination process according to the embodiment.

FIG. 15 is a diagram (9) illustrating an example of the path determination process according to the embodiment. FIG. 15 exemplifies a case in which, in accordance with the purpose of allowing the air vehicle 60 to fly in a stereoscopic area surrounding the building object BD in a predetermined mode, the user U1 installs the terminal device 10-1, the terminal device 10-2, and the terminal device 10-3 on the three respective ends of the building object BD on the ground, and furthermore, installs the terminal device 10-4 on the rooftop of the building object BD. In the example illustrated in FIG. 15, as compared to the example illustrated in FIG. 12, another single piece of the terminal device 10-x is added (total four). Furthermore, in the example illustrated in FIG. 15, as compared to the example illustrated in FIG. 12, the added terminal device 10-x is further installed on the rooftop of the building object BD. Specifically, in the example illustrated in FIG. 15, the added terminal device 10-4 is installed on the rooftop of the building object BD. Namely, the user U1 may assign, for example, the terminal devices 10-1 to 10-4 to the respective points of origin in a state in which these terminal devices are set as the use targets and input, to the determination device 200, the definition information for defining the vertex points corresponding to the respective vertices of the stereoscopic area.

Specifically, the user U1 may input, to the determination device 200, the definition information 1 indicating an instruction to, for example, [define the position of the terminal device 10-1 as a single vertex (the vertex point T31)]. Furthermore, the user U1 may input, to the determination device 200, the definition information 2 indicating an instruction to, for example, [define the position of the terminal device 10-2 as a single vertex (the vertex point T32)]. Furthermore, the user U1 may input, to the determination device 200, the definition information 3 indicating an instruction to, for example, [define the position of the terminal device 10-3 as a single vertex (the vertex point T33)]. Furthermore, the user U1 may input, to the determination device 200, the definition information 4 indicating an instruction to, for example, [further define the position on the diagonal line based on the pieces of definition information 1 to 3 as another single vertex (the vertex point T34)]. Furthermore, the user U1 may input, to the determination device 200, the definition information 5 indicating an instruction to, for example, [define a stereoscopic area having a bottom surface corresponding to a surface obtained by connecting the vertex points T31 to T34 and a height corresponding to the position of the terminal device 10-4].

In this case, the determination unit 233 may calculate, as the positions of the vertex points, the positions that satisfy the pieces of the definition information 1 to 4 based on the pieces of corrected positional information associated with the three respective terminal devices 10-x (reference coordinates) installed on the ground.

Specifically, the determination unit 233 may define, for example, the reference coordinates P10-1 at "x3,y3,z3" associated with the terminal device 10-1 as the position of the vertex point T31. Furthermore, the determination unit 233 may define, for example, the reference coordinates P10-2 at "x4,y4,z4" associated with the terminal device 10-2 as the position of the vertex point T32. Furthermore, the determination unit 233 may define, for example, the reference coordinates P10-3 at "x5,y5,z5" associated with the terminal device 10-3 as the position of the vertex point T33. Furthermore, the determination unit 233 may calculate relative coordinates t34 on the basis of these three reference coordinates. The determination unit 233 may define, for example, the relative coordinates t34 as the position of the vertex point T34.

Furthermore, the determination unit 233 may calculate, as the positions of the vertex points, the positions that are the relative positions based on the positions indicated by the pieces of corrected positional information associated with each of the terminal devices 10-*x* (reference coordinates) and that satisfy the definition information 5. For example, the determination unit 233 may calculate the four remaining vertex points (the vertex points T35 to T38) by applying the height indicated by the reference coordinates P10-4 at "x6,y6,z6" associated with the terminal device 10-4 to the surface obtained by connecting the vertex points T31 to T34.

For example, the determination unit 233 may calculate the relative coordinates t35 on the basis of the reference coordinates P10-1 at "x3,y3,z3" associated with the terminal device 10-1 and the reference coordinates P10-4. Then, the determination unit 233 may define the relative coordinates t35 as the position of the vertex point T35. Furthermore, the determination unit 233 may calculate the relative coordinates t36 on the basis of, for example, the reference coordinates P10-2 at "x4,y4,z4" associated with the terminal device 10-2 and the reference coordinates P10-4. Then, the determination unit 233 may define, for example, relative coordinates t36 as the position of the vertex point T36. Furthermore, the determination unit 233 may calculate the relative coordinates t37 on the basis of, for example, the reference coordinates P10-3 at "x5,y5,z5" associated with the terminal device 10-3 and the reference coordinates P10-4. Then, the determination unit 233 may define the relative coordinates t37 as the position of the vertex point T37. Furthermore, the determination unit 233 may define the remaining relative coordinates t38 on the basis of the relationship among the relative coordinates t35 to t37. Then, the determination unit 233 may define the relative coordinates t38 as the position of the vertex point T38.

Furthermore, the determination unit 233 may generate the stereoscopic area AR12 by connecting the eight defined vertex points T31 to T38. Furthermore, the determination unit 233 may determine a flight path in accordance with the definition information defined by the user U1. Moreover, the flight path may be the same trajectory as the trajectory described in the path determination process (5). Furthermore, the determination unit 233 may input the path information indicating the determined flight path to the air vehicle 60.

5-10. Path Determination Process (10)

Figure 16:
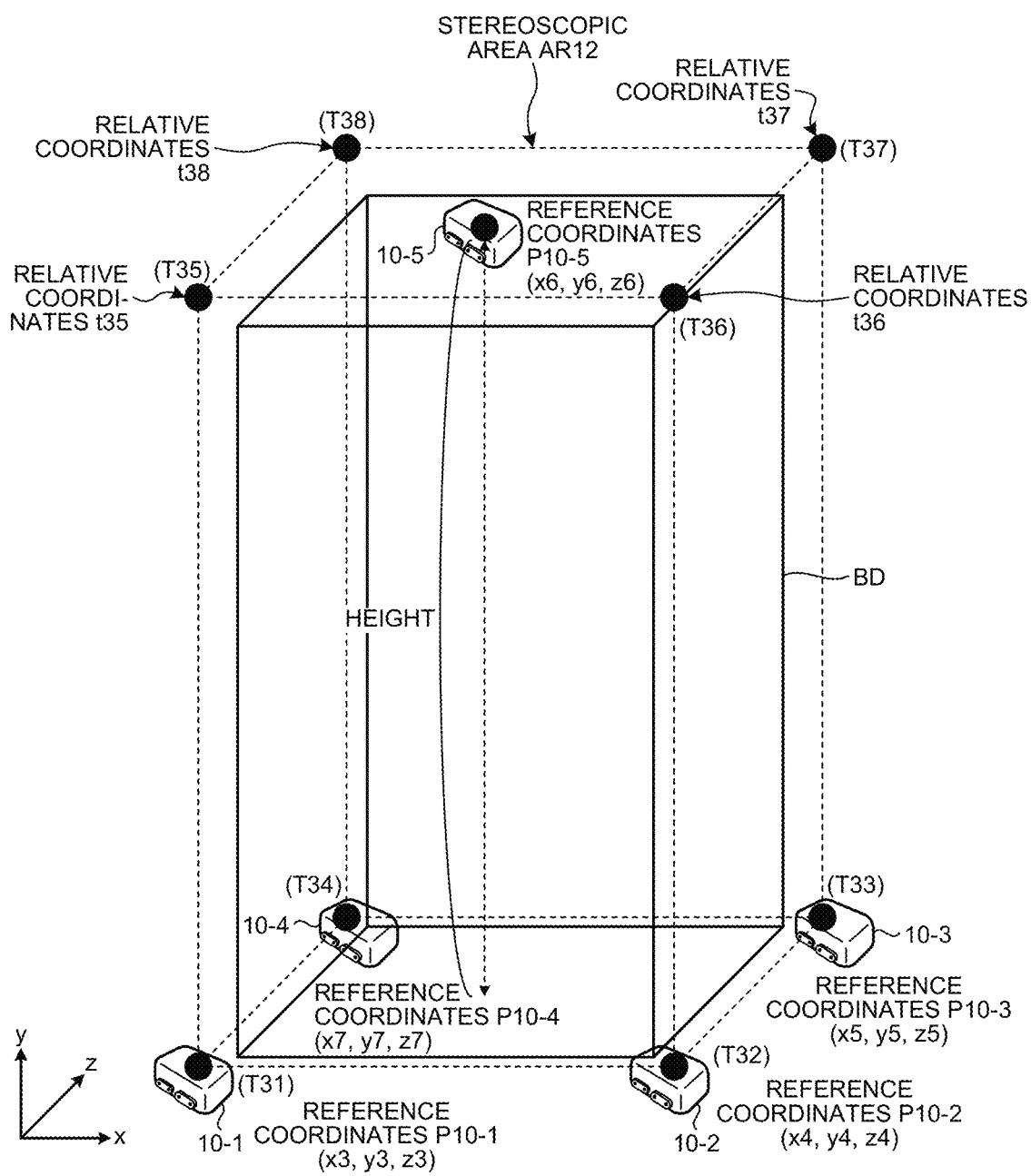
FIG. 16 is a diagram (10) illustrating an example of a path determination process according to the embodiment.

FIG. 16 is a diagram (10) illustrating an example of the path determination process according to the embodiment. FIG. 16 exemplifies a case in which in accordance with the purpose of allowing the air vehicle 60 to fly in a stereoscopic area surrounding the building object BD in a predetermined mode, the user U1 installs the terminal device 10-1, the terminal device 10-2, the terminal device 10-3, and the terminal device 10-4 at the four respective ends of the building object BD on the ground, and furthermore, installs a terminal device 10-5 on the rooftop of the building object BD. In the example illustrated in FIG. 16, as compared to the example illustrated in FIG. 14, another single piece of the terminal device 10-*x* is added (total five). Furthermore, in the example illustrated in FIG. 16, as compared to the example illustrated in FIG. 14, the added single terminal device 10-*x* is further installed on the rooftop of the building object BD. Specifically, in the example illustrated in FIG. 16, the added terminal device 10-5 is installed on the rooftop of the building object BD. Namely, the user U1 may assign, for example, the terminal devices 10-1 to 10-5 to the respective points of origin in a state in which these terminal devices are set as the use targets and input, to the determination device 200, the definition information for defining the vertex points corresponding to the respective vertices of the stereoscopic area.

Specifically, the user U1 may input, to the determination device 200, the definition information 1 indicating an instruction to, for example, [define the position of the terminal device 10-1 as a single vertex (the vertex point T31)]. Furthermore, the user U1 may input, to the determination device 200, the definition information 2 indicating an instruction to, for example, [define the position of the terminal device 10-2 as a single vertex (the vertex point T32)]. Furthermore, the user U1 may input, to the determination device 200, the definition information 3 indicating an instruction to, for example, [define the position of the terminal device 10-3 as a single vertex (the vertex point T33)]. Furthermore, the user U1 may input, to the determination device 200, the definition information 4 indicating an instruction to, for example, [define the position of the terminal device 10-4 as a single vertex (the vertex point T34)]. Furthermore, the user U1 may input, to the determination device 200, the definition information 5 indicating an instruction to, for example, [define a stereoscopic area having a bottom surface corresponding to a surface obtained by connecting the vertex points T31 to T34 and a height corresponding to the position of the terminal device 10-5].

In this case, the determination unit 233 may calculate, as the positions of the vertex points, the positions that satisfy the pieces of the definition information 1 to 4 based on the pieces of corrected positional information associated with the four respective terminal devices 10-*x* (reference coordinates) installed on the ground.

Specifically, the determination unit 233 may define, for example, the reference coordinates P10-1 at "x3,y3,z3" associated with the terminal device 10-1 as the position of the vertex point T31. Furthermore, the determination unit 233 may define, for example, the reference coordinates P10-2 at "x4,y4,z4" associated with the terminal device 10-2 as the position of the vertex point T32. Furthermore, the determination unit 233 may define, for example, the reference coordinates P10-3 at "x5,y5,z5" associated with the terminal device 10-3 as the position of the vertex point T33. Furthermore, the determination unit 233 may define, for example, the reference coordinates P10-4 at "x7,y7,z7" associated with the terminal device 10-4 as the position of the vertex point T34.

Furthermore, the determination unit 233 may calculate, as the positions of the vertex points, the positions that are the relative positions based on the coordinates (reference coordinates) at the positions indicated by the pieces of corrected positional information associated with each of the terminal devices 10-*x* and that satisfy the definition information 5. For example, the determination unit 233 may calculate the four remaining vertex points (the vertex points T35 to T38) by applying the height indicated by reference coordinates P10-5 at "x6,y6,z6" associated with the terminal device 10-5 to the surface obtained by connecting the vertex points T31 to T34.

For example, the determination unit 233 may calculate the relative coordinates t35 on the basis of the reference coordinates P10-1 at "x3,y3,z3" associated with the terminal device 10-1 and the reference coordinates P10-5. Then, the determination unit 233 may determine the relative coordinates t35 as the position of the vertex point T35. Furthermore, the determination unit 233 may calculate the relative coordinates t36 on the basis of, for example, the reference coordinates P10-2 at "x4,y4,z4" associated with the terminal device 10-2 and the reference coordinates P10-5. Then, the determination unit 233 may define the relative coordinates t36 as the position of the vertex point T36. Furthermore, the determination unit 233 may calculate the relative coordinates t37 on the basis of, for example, the reference coordinates P10-3 at "x5,y5,z5" associated with the terminal device 10-3 and the reference coordinates P10-5. Then, the determination unit 233 may determine the relative coordinates t37 as the position of the vertex point T37. Furthermore, the determination unit 233 may calculate the relative coordinates t38 on the basis of, for example, the reference coordinates P10-4 at "x7,y7,z7" associated with the terminal device 10-4 and the reference coordinates P10-5. Then, the determination unit 233 may define the relative coordinates t38 as the position of the vertex point T38.

Furthermore, the determination unit 233 may generate the stereoscopic area AR12 by connecting the eight defined vertex points T31 to T38. Furthermore, the determination unit 233 may determine a flight path in accordance with the definition information defined by the user U1. Moreover, the flight path may be the same trajectory as the trajectory described in the path determination process (5). Furthermore, the determination unit 233 may input the path information indicating the determined flight path to the air vehicle 60.

6. Flow of Process

Figure 17:
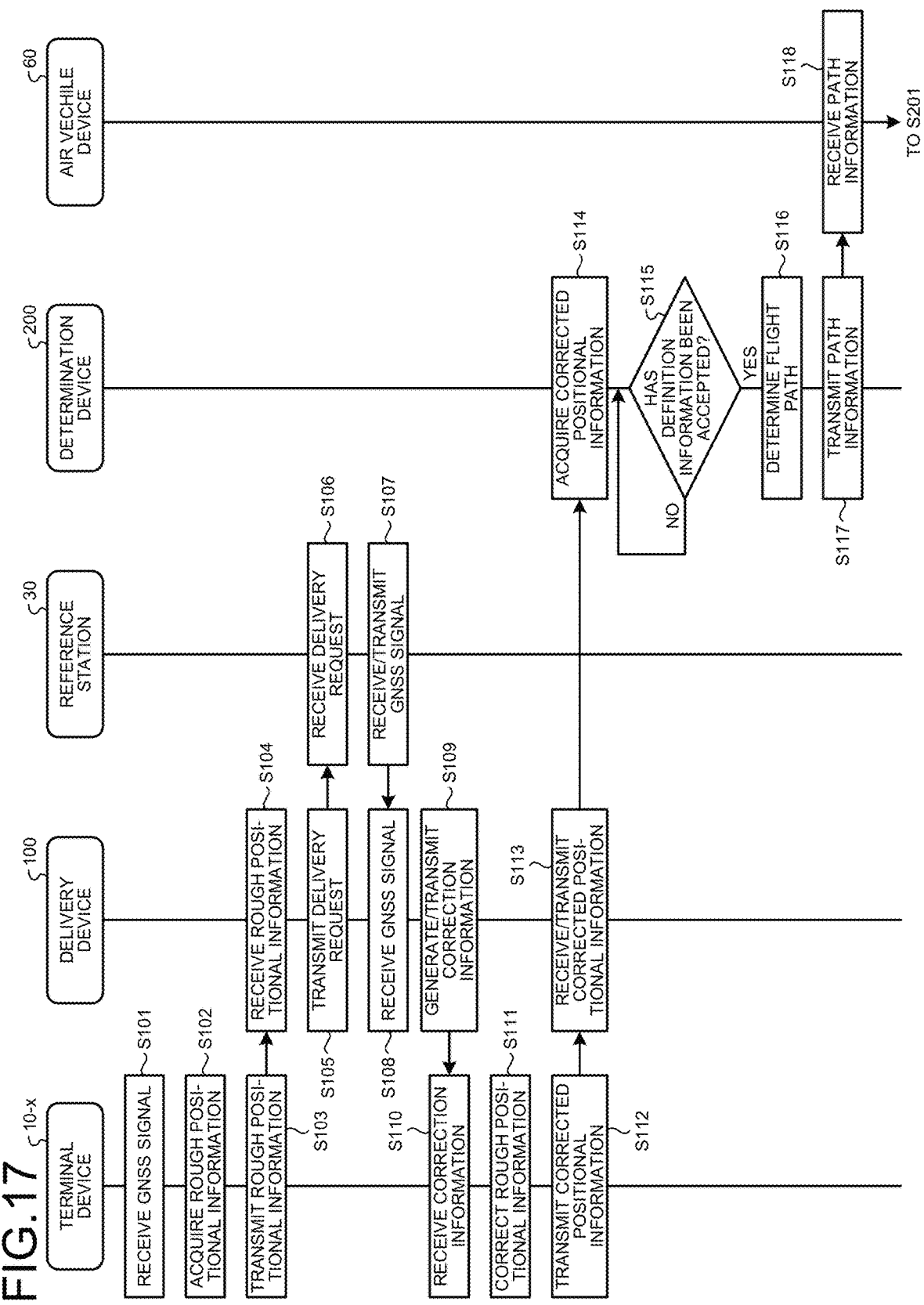
FIG. 17 is a sequence diagram (1) illustrating a path control process performed by a path determination system according to the embodiment.
Figure 18:
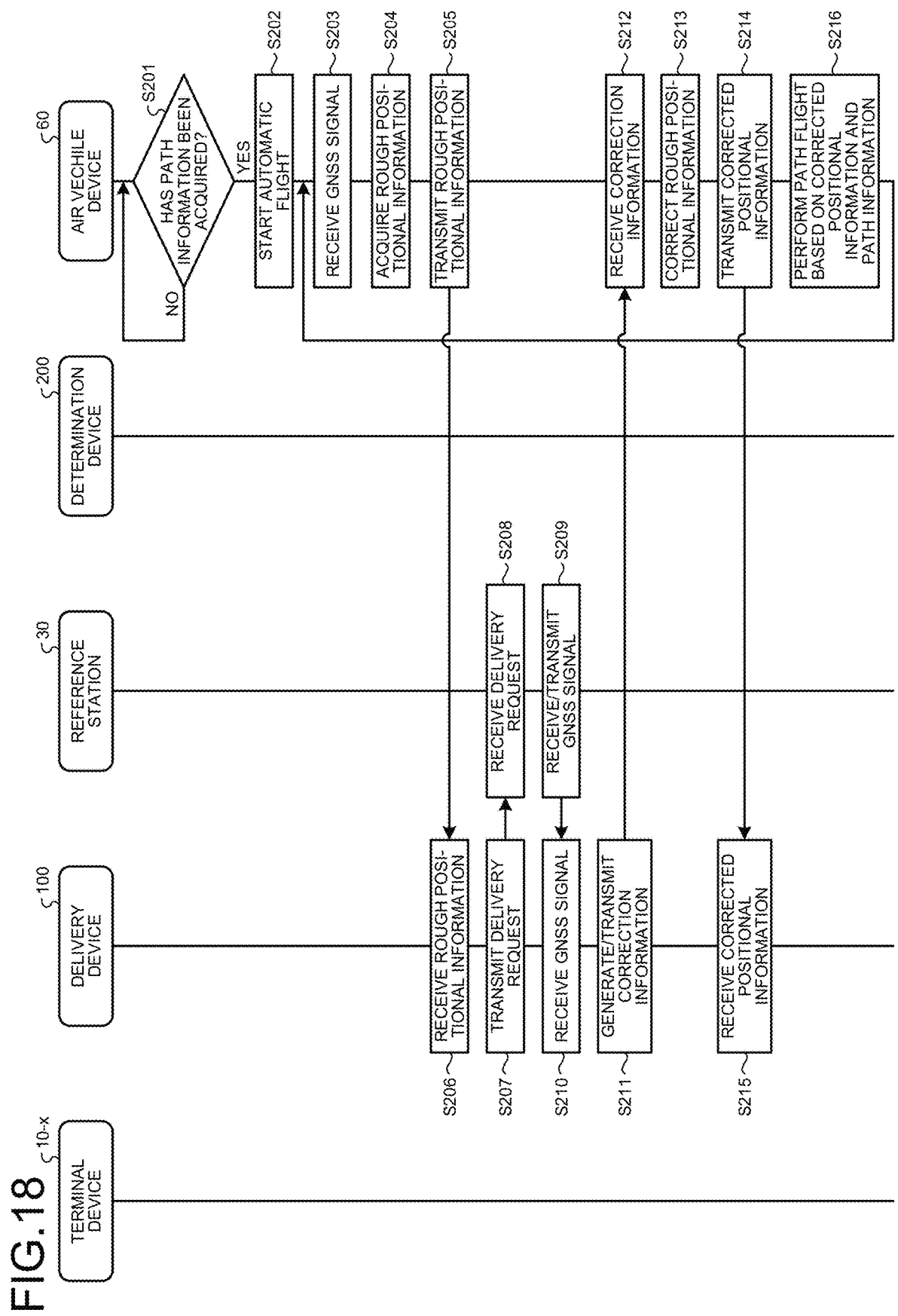
FIG. 18 is a sequence diagram (2) illustrating the path control process performed by the path determination system according to the embodiment.

In the following, the flow of a path control process performed by the path determination system 1 according to the embodiment will be described with reference to FIG. 17 and FIG. 18. In FIG. 17, the flow of the path control process mainly performed on the server device side will be described. In FIG. 18, the flow of the path control process mainly performed on the air vehicle 60 side will be described.

6-1. Flow of Process (1)

FIG. 17 is a sequence diagram (1) illustrating the path control process performed by the path determination system 1 according to the embodiment.

First, it is assumed that the power supply of the terminal device 10-x functioning as the use target is turned ON caused by being installed at an arbitrary location functioning as a reference for the path of the air vehicle. Then, the first reception unit 13a in the terminal device 10-x starts to receive the GNSS signal (Step S101). Furthermore, the rough position calculating unit 13b in the terminal device 10-x calculates the positional information indicating the position (installation position) of the own device by using GNSS positioning based on the GNSS signal received by the first reception unit 13a (Step S102). Namely, the rough position calculating unit 13b calculates rough positional information on the basis of the GNSS signal.

The first transmission unit 13c in the terminal device 10-x transmits the rough positional information calculated by the rough position calculating unit 13b to the delivery device 100 (Step S103). Then, the rough position acquiring unit 131 in the delivery device 100 acquires (receives) the rough positional information transmitted by the first transmission unit 13c (Step S104).

If the rough positional information is acquired by the rough position acquiring unit 131, the requesting unit 132 in the delivery device 100 transmits, to the reference station 30, a delivery request that is a request to deliver the GNSS signal (Step S105). For example, the requesting unit 132 selects the reference station 30 corresponding to the processing target on the basis of the rough positional information and transmits the delivery request to the reference station 30 corresponding to the processing target.

If the reference station 30 receives the delivery request from the requesting unit 132 (Step S106), the reference station 30 transmits, to the delivery device 100, the GNSS signal detected at the time of reception of the delivery request (Step S107). The requesting unit 132 receives the GNSS signal transmitted from the reference station 30 (Step S108).

The generating unit 133 in the delivery device 100 generates the correction information on the basis of the GNSS signal received from the requesting unit 132 and transmits the correction information to the terminal device 10-x (Step S109). For example, the generating unit 133 uses the known coordinates of the reference station 30 as a reference point and generates the correction information on the basis of the subject coordinates and the GNSS signal.

The second reception unit 13d in the terminal device 10-x receives the correction information transmitted from the delivery device 100 (Step S110). Furthermore, on the basis of the correction information received by the second reception unit 13d, the correction unit 13e in the terminal device 10-x performs correction calculation for correcting the rough positional information calculated by the rough position calculating unit 13b (Step S111). For example, the correction unit 13e corrects the rough positional information by performing the RTK calculation using the correction information.

Furthermore, the second transmission unit 13f in the terminal device 10-x transmits the corrected positional information obtained from the RTK calculation performed by the correction unit 13e at Step S111 to the delivery device 100 (Step S112). The corrected positional information acquiring unit 134 in the delivery device 100 receives (acquires) the corrected positional information transmitted by the second transmission unit 13f, and then, the transmission unit 135 transmits the corrected positional information to the determination device 200 (Step S113).

The corrected positional information acquiring unit 231 in the determination device 200 acquires (receives) the corrected positional information transmitted by the transmission unit 135 (Step S114).

Here, for example, by repeatedly performing the processes at Steps S105 to S114, the latest corrected positional information at this time is accumulated in the determination device 200. The accepting unit 232 in the determination device 200 judges whether the definition information for defining a flight path has been received from a user while accumulating the corrected positional information (Step S115). If the accepting unit 232 judges that the definition information has not been accepted (No at Step S115), the accepting unit 232 waits until it is judged that the definition information has been accepted.

In contrast, if it is judged, by the accepting unit 232, that the definition information has been accepted (Yes at Step S115), the determination unit 233 determines a flight path on the basis of the corrected positional information and the definition information (Step S116). The path determination process performed here has been described, as examples, in the path determination process (1) to the path determination process (10); descriptions thereof will be omitted. Moreover, the path determination process is not limited to the examples described in the path determination process (1) to the path determination process (10).

The instruction unit 234 in the determination device 200 transmits the path information indicating the flight path determined by the determination unit 233 to the air vehicle 60. Namely, the determination device 200 instructs the air vehicle 60 to fly along the flight path indicated by the path information (Step S117). The path information acquiring unit 65b included in the air vehicle device 60 acquires (receives) the path information transmitted from the instruction unit 234 (Step S118).

6-2. Flow of Process (2)

FIG. 18 is a sequence diagram (2) illustrating a path control process performed by the path determination system 1 according to the embodiment. In the example illustrated in FIG. 18, continued from Step S118, the flow of flight control performed on the air vehicle 60 side will be mainly described.

The path information acquiring unit 65b judges whether the path information is able to be acquired from the determination device 200 (Step S201). In a period for which it is judged that the path information is not able to be acquired (No at Step S201), the path information acquiring unit 65b waits until it is able to judge that the path information has been acquired. In contrast, if it is judged that the path information has been acquired (Yes at Step S201), the flight control unit 65c starts an automatic flight based on the path information (Step S202).

If an automatic flight is started by the flight control unit 65c, the air vehicle 60 may fly along the flight path indicated by the path information. Specifically, for example, by repeatedly performing the processes described below until the air vehicle 60 reaches the reach target indicated by the path information, the air vehicle 60 may fly along the flight path indicated by the path information. Moreover, in a description below, an example in which the terminal device 10-x is mounted on the air vehicle 60 (the air vehicle device 60) will be described.

For example, the first reception unit 13a in the terminal device 10-x always receives the GNSS signal after an automatic flight of the air vehicle 60 is started (Step S203). Thus, the rough position calculating unit 13b in the terminal device 10-x calculates the positional information indicating the current location of the air vehicle 60 by performing the GNSS positioning on the basis of the GNSS signal received by the first reception unit 13a (Step S204). Namely, the rough position calculating unit 13b calculates the rough positional information on the basis of the GNSS signal.

The first transmission unit 13c in the terminal device 10-x transmits the rough positional information calculated by the rough position calculating unit 13b to the delivery device 100 (Step S205). Then, the rough position acquiring unit 131 in the delivery device 100 acquires the rough positional information transmitted by the first transmission unit 13c (Step S206).

If the rough positional information is acquired by the rough position acquiring unit 131, the requesting unit 132 in the delivery device 100 transmits, to the reference station 30, a delivery request that is a request to deliver the GNSS signal (Step S207). For example, the requesting unit 132 selects the reference station 30 corresponding to the processing target on the basis of the rough positional information and transmits the delivery request to the selected reference station 30 corresponding to the processing target.

If the reference station 30 receives the delivery request from the requesting unit 132 (Step S208), the reference station 30 transmits the detected GNSS signal to the delivery device 100 at the time of reception of the delivery request (Step S209). The requesting unit 132 receives the GNSS signal transmitted from the reference station 30 (Step S210).

The generating unit 133 in the delivery device 100 generates the correction information on the basis of the GNSS signal received by the requesting unit 132 and transmits the generated correction information to the terminal device 10-x (Step S211). For example, the generating unit 133 generates the correction information on the basis of the coordinates of the reference station 30.

The second reception unit 13d in the terminal device 10-x receives the correction information transmitted from the delivery device 100 (Step S212). Furthermore, on the basis of the correction information received by the second reception unit 13d, the correction unit 13e in the terminal device 10-x performs correction calculation for calculating the rough positional information calculated at Step S204 (Step S213). For example, the correction unit 13e corrects the rough positional information by performing the RTK calculation using the correction information. Here, the corrected positional information acquiring unit 65a in the air vehicle device 60 acquires the corrected positional information obtained by the RTK calculation performed by the correction unit 13e at Step S213 and outputs the acquired corrected positional information to the flight control unit 65c.

Furthermore, the second transmission unit 13f in the terminal device 10-x transmits the corrected positional information obtained from the RTK calculation performed by the correction unit 13e at Step S213 to the delivery device 100 (Step S214). The corrected positional information acquiring unit 134 in the delivery device 100 receives (acquires) the corrected positional information transmitted by the second transmission unit 13f (Step S215). Furthermore, although not illustrated in FIG. 18, the transmission unit 135 in the delivery device 100 transmits the received corrected positional information to the determination device 200.

The flight control unit 65c may control a flight of the air vehicle 60 on the basis of the corrected positional information that is output from the corrected positional information acquiring unit 65a and the path information that is acquired by the path information acquiring unit 65b. Specifically, the flight control unit 65c controls a flight of the air vehicle 60 such that, for example, the air vehicle 60 flies on the flight path indicated by the path information (Step S216). The flight control unit 65c may control the flight of the air vehicle 60 while comparing the current location indicated by the corrected positional information with the position of the orbit indicated by the path information. Specifically, the air vehicle 60 may fly while adjusting the current location so as to fly along the orbit by comparing the current location with the position of the orbit. The air vehicle 60 may fly toward the reach target while adjusting the current location so as not to deviate from the position of, for example, the orbit.

Furthermore, by repeatedly performing the processes at Steps S203 to S216, the flight control unit 65c is able to continuously acquire the corrected positional information. Namely, the flight control unit 65c is able to continuously acquire a relatively high accurate current location (current location of the air vehicle 60) that varies due to a movement of the flight. Consequently, in one embodiment, the air vehicle device 60 is able to implement a relatively high accurate flight along the orbit indicated by the path information. Furthermore, in one embodiment, even if, for example, the air vehicle 60 deviates from the flight path caused by wind or the like, the air vehicle device 60 is able to detect the deviation. Furthermore, in one embodiment, if the air vehicle 60 deviates from the flight path, the air vehicle device 60 is able to allow the air vehicle 60 to return the flight path.

Furthermore, as described above, the transmission unit 135 is able to continuously transmit the corrected positional information indicating the current location of the air vehicle 60 to the determination device 200. Therefore, the determination device 200 is able to accumulate the corrected positional information associated with the air vehicle 60. Accordingly, the determination device 200 is able to recognize the current location of the air vehicle 60.

Here, in one embodiment, the determination device 200 is able to recognize the current location of the air vehicle 60. Furthermore, the determination device 200 also stores therein the path information indicating the flight path determined with respect to the air vehicle 60. Consequently, the determination device 200 according to one embodiment may judge whether the air vehicle 60 flies the subject flight path (i.e., whether the air vehicle 60 deviates from the flight path). Furthermore, if it is judged that the air vehicle 60 deviates from the flight path determined by the determination unit 233, the output unit 235 in the determination device 200 may output information indicating that the air vehicle 60 has deviated from the flight path. For example, the output unit 235 may output, from the terminal device T held by the user of the air vehicle 60, the information indicating the deviation from the flight path. Specifically, the output unit 235 may cause the terminal device T to output an alert in a case where, for example, the air vehicle 60 deviates from the flight path. Furthermore, for example, the output unit 235 may cause the terminal device T to display map information in which the flight path and a point deviated from the flight path are superimposed.

7. Other Embodiments

The terminal device 10-x is expected to be effectively used in various fields other than the examples described above by combining the path control processes exemplified in the above described embodiment. In the following, an example of a use case used in the terminal device 10-x will be described.

For example, it is assumed that, after the terminal device 10-x has been installed in a predetermined object, the definition information conforming to a purpose is input. In this case, the determination device 200 may control the air vehicle 60 so as to fly on the flight path following the object in a state in which the air vehicle 60 maintains a predetermined distance from the object. According to this, the determination device 200 according to one embodiment is able to acquire captured images of a moving object, such as a vehicle, a railway, or a drone, while maintaining a constant distance from the object. Furthermore, for example, if capturing of images is performed for a purpose of inspecting the object, the determination device 200 is able to enhance the accuracy of the inspection by acquiring the images captured by maintaining a constant distance.

Furthermore, the determination device 200 may determine an optimum flight path on the basis of a history of the positional information (corrected positional information) obtained from the terminal device 10-x. For example, if the terminal device 10-x is mounted on a vehicle, the determination device 200 may detect, on the basis of the history of the positional information obtained from the terminal device 10-x, a moving trajectory indicating a trajectory of the movement of the subject vehicle. In this case, if the terminal device 10-x is mounted on a larger number of vehicles, the determination device 200 is able to detect statistics of the moving trajectory. Namely, the determination device 200 according to one embodiment may detect a roadway. In this case, the determination device 200 may determine, as a flight path, the trajectory deviated from the moving trajectory detected from the air over the detected moving trajectory (roadway). Specifically, the determination device 200 may determine, as a flight path, the trajectory along the moving trajectory in the air over the moving trajectory. According to this, the determination device 200 according to one embodiment is able to reduce the risk of a state in which the air vehicle 60 falls toward the vehicle or the roadway. Furthermore, the determination device 200 according to one embodiment is able to determine a flight path from which images of traffic conditions can be captured.

Furthermore, the determination device 200 may also determine an optimum flight path for inspecting a railway track on the basis of the history of the positional information (corrected positional information) obtained from the terminal device 10-x. In this case, because the terminal device 10-x is mounted on a railroad, the determination device 200 according to one embodiment is able to detect relatively accurate coordinates in accordance with the railroad. Namely, the determination device 200 according to one embodiment is able to effectively use the air vehicle 60 to inspect a railway track by determining the trajectory indicated by the coordinates according to the railway track on the basis of a flight on the flight path.

8. Hardware Configuration

Figure 19:
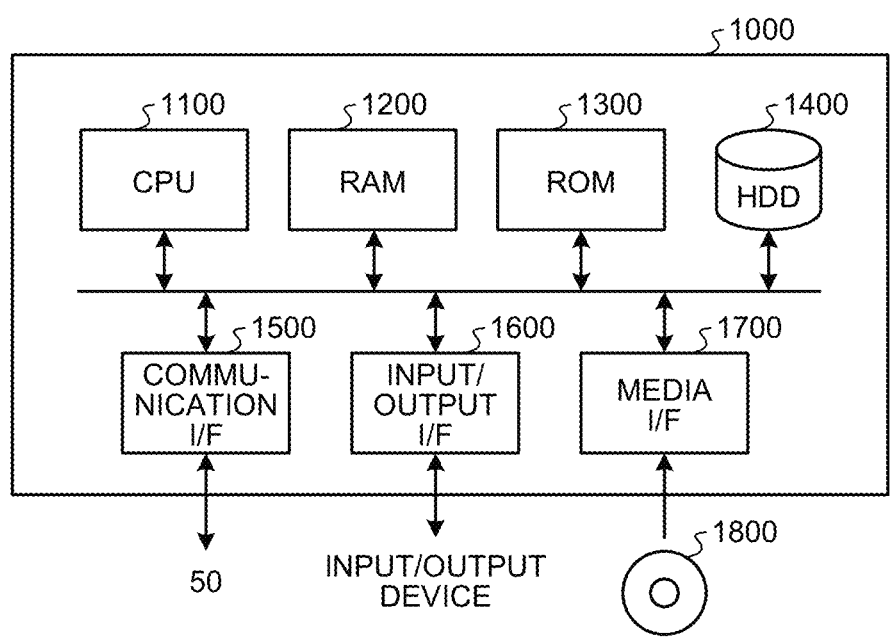
FIG. 19 is a hardware configuration diagram illustrating an example of a computer that implements a function of the determination device.

Furthermore, the terminal device 10-x, the air vehicle device 60, the delivery device 100, and the determination device 200 that are included in the path determination system 1 according to the embodiment may be implemented by a computer 1000 having a configuration illustrated in, for example FIG. 19. In the following, a description will be made by using the determination device 200 as an example. FIG. 19 is a diagram of a hardware configuration illustrating an example of the computer 1000 that implements a function of the determination device 200. The computer 1000 may include a CPU 1100, a RAM 1200, a ROM 1300, an HDD 1400, a communication interface (I/F) 1500, an input/output interface (I/F) 1600, and a media interface (I/F) 1700.

The CPU 1100 may operate on the basis of programs stored in the ROM 1300 or the HDD 1400 and perform each of the units. The ROM 1300 may store a boot program executed by the CPU 1100 that the time of activation of the computer 1000, a program that depends on the hardware of the computer 1000, or the like.

The HDD 1400 may store a program executed by the CPU 1100, data used by the program, and the like. The communication interface 1500 may receive data from another apparatus via a communication network 50 and transmit the received data to the CPU 1100. The communication interface 1500 may transmit the data generated by the CPU 1100 to the other apparatus via the communication network 50.

The CPU 1100 may control, via the input/output interface 1600, an output device, such as a display or a printer, and an input device, such as a keyboard or a mouse. The CPU 1100 may acquire data from the input device via the input/output interface 1600. Furthermore, the CPU 1100 may output the generated data to the output device via the input/output interface 1600.

The media interface 1700 may read the program or the data stored in a recording medium 1800 and provide the read program or data to the CPU 1100 via the RAM 1200. The CPU 1100 may load the program into the RAM 1200 from the recording medium 1800 via the media interface 1700 and execute the loaded program. The recording medium 1800 may be an optical recording medium, such as a digital versatile disk (DVD), a magneto optical recording medium, such as a magneto optical disk (MO), a tape medium, a magnetic recording medium, or a semiconductor memory.

For example, if the computer 1000 functions as the determination device 200 according to the embodiment, the CPU 1100 in the computer 1000 may execute the program loaded in the RAM 1200 and implement the functions of the control unit 230. Furthermore, the HDD 1400 may store therein data that is stored in the storage unit 120. The CPU 1100 may read these programs from the recording medium 1800 and execute the programs. The CPU 1100 may acquire these programs from a different device via the communication network 50.

9. Others

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

For example, if the plurality of terminal devices 10-*x* are included in the embodiment described above, the plurality of terminal devices 10-*x* may be different devices. Namely, the plurality of terminal devices 10-*x* need not always be the same devices as long as the terminal devices 10-*x* are able to implement a function of the respective terminal devices 10-*x*. For example, each of the shapes or the functions of the devices may be different depending on a situation in which the terminal device 10-*x* is installed or mounted.

In the above, embodiments of the present invention have been described in detail based on the drawings; however the embodiments are described only by way of an example. In addition to the embodiments described in disclosure of invention, the present invention can be implemented in a mode in which various modifications and changes are made in accordance with the knowledge of those skilled in the art.

Furthermore, the "components (sections, modules, units)" described above can be read as "means", "circuits", or the like. For example, the determination unit can be read as a determination means, a determination circuit, or the like.

REFERENCE SIGNS LIST

1 path determination system
10 terminal device
13*a* first reception unit
13*b* rough position calculating unit
13*c* first transmission unit
13*d* second reception unit
13*e* correction unit
13*f* second transmission unit
30 reference station
60 air vehicle device (air vehicle)
65*a* corrected positional information acquiring unit
65*b* path information acquiring unit
65*c* flight control unit
100 delivery device
131 rough position acquiring unit
132 requesting unit
133 generating unit
134 corrected positional information acquiring unit
135 transmission unit
200 determination device
232 accepting unit
233 determination unit
234 instruction unit
235 output unit

The invention claimed is:

1. A path determination system, comprising:
    a determination device;
    an air vehicle; and
    a terminal device installed at a location serving as a reference for a flight path of the air vehicle, wherein the determination device includes a memory and a processor coupled to the memory, the processor configured to execute a process including:
        acquiring positional information that is related to the terminal device and that is calculated on the basis of correction information that includes information on coordinates of a reference station associated with an area in which the terminal device is positioned and information based on a satellite signal received by the reference station;
        accepting, from a user, definition information for defining the flight path, in the definition information a target point at which the air vehicle is allowed to reach being defined in a state in which a predetermined terminal device out of terminal devices is set as a use target; and
        determining, when the definition information is accepted, a flight path of the air vehicle on the basis of the acquired positional information on the terminal device corresponding to the use target and the accepted definition information,
        wherein the flight path includes a position that is a relative position based on a position indicated by the acquired positional information and satisfies the definition information.

2. The path determination system according to claim 1, wherein the processor is further configured to execute
    determining the flight path of the air vehicle including a relative position further from a position that satisfies the definition information.

3. The path determination system according to claim 1, wherein the processor is further configured to execute
    acquiring, as the positional information on the terminal device, positional information calculated by a real time kinematic positioning technique using the correction information, or acquiring, as the positional information on the terminal device, positional information corrected by the terminal device based on the correction information.

4. The path determination system according to claim 1, wherein, when the definition information in which the target point is defined in a state in which a single predetermined terminal device out of the terminal devices is set as the use target is accepted, the processor is further configured to execute
    calculating, as a position of the target point, a position that satisfies the definition information and that is a relative position based on a position indicated by the positional information on the terminal device.

5. The path determination system according to claim 1, wherein, when the definition information in which a start point associated with one of two predetermined terminal devices out of the terminal devices and a reach point associated with another of the two terminal devices are defined as target points in a state in which the two predetermined terminal devices are set as use targets is accepted, the processor is further configured to execute determining, as positions of the target points, positions that satisfy the definition information and that are relative positions based on positions indicated by the positional information on the two predetermined terminal devices, an orbit along which the air vehicle is allowed to fly from a position associated with the start point to a position associated with the reach point between the calculated positions as the flight path of the air vehicle.

6. The determination device according to claim 1, wherein the processor is further configured to execute accepting the definition information in which vertex points corresponding to respective vertices of a planar area in a space are defined in a state in which predetermined terminal devices out of the terminal devices are set as use targets, and when the definition information in which the vertex points are defined is accepted, determining, as the vertex points, positions that satisfy the definition information and that are relative positions based on positions indicated by positional information on the predetermined terminal devices as the acquired positional information, and generating the planar area in which the calculated vertex points are set as the vertices, the flight path of the air vehicle on the basis of the generated planar area.

7. The path determination system according to claim 6, wherein the processor is further configured to execute determining, as the flight path of the air vehicle, a trajectory along which the air vehicle is allowed to move in the planar area so as to move along the planar area in accordance with the definition information.

8. The path determination system according to claim 1, wherein the processor is further configured to execute accepting the definition information in which vertex points corresponding to vertices of a stereoscopic area in a space are defined in a state in which at least two predetermined terminal devices out of the terminal devices are set as use targets, and when the definition information in which the vertex points are defined is accepted, determining, by calculating, as the vertex points, positions that satisfy the definition information and that are relative positions based on positions indicated by positional information on the two predetermined terminal devices as the acquired positional information acquired, and generating the stereoscopic area in which the calculated vertex points are set as the vertices of a planar area of the stereoscopic area, the flight path of the air vehicle on the basis of the generated stereoscopic area.

9. The path determination system according to claim 8, wherein the processor is further configured to execute determining a flight path of an air vehicle, as the flight path of the air vehicle, a trajectory along which the air vehicle is allowed to move in a predetermined planar area so as to move along the predetermined planar area included in planar areas constituting the stereoscopic area in accordance with the definition information.

* * * * *